(12) United States Patent
Yu et al.

(10) Patent No.: US 9,824,509 B2
(45) Date of Patent: Nov. 21, 2017

(54) AUTOMOBILE MODIFICATION SYSTEM PROVIDING SECURITY AND FAULT TOLERANCE SUPPORT

(71) Applicant: TOYOTA JIDOSHA KABUSHIKI KAISHA, Toyota-shi, Aichi-ken (JP)

(72) Inventors: Huafeng Yu, Cupertino, CA (US); Bowen Zheng, Riverside, CA (US)

( * ) Notice: Subject to any disclaimer, the term of this patent is extended or adjusted under 35 U.S.C. 154(b) by 32 days.

(21) Appl. No.: 15/013,923

(22) Filed: Feb. 2, 2016

(65) Prior Publication Data
US 2017/0221279 A1    Aug. 3, 2017

(51) Int. Cl.
| | | |
|---|---|---|
| *G01M 17/00* | (2006.01) | |
| *G07C 5/02* | (2006.01) | |
| *G06F 21/64* | (2013.01) | |
| *G06F 21/57* | (2013.01) | |
| *H04L 29/08* | (2006.01) | |

(52) U.S. Cl.
CPC .......... *G07C 5/02* (2013.01); *G06F 21/577* (2013.01); *G06F 21/645* (2013.01); *G06F 2221/034* (2013.01); *H04L 67/12* (2013.01)

(58) Field of Classification Search
CPC .......... G07C 5/02; G07C 5/085; G07C 5/008; G07C 5/0825; G07C 5/0858; G06F 21/577; G06F 21/645; G06F 2221/034; H04L 67/12; B60R 16/0231
USPC ....................................................... 701/32.6
See application file for complete search history.

(56) References Cited

U.S. PATENT DOCUMENTS

| | | | | |
|---|---|---|---|---|
| 7,275,181 B2* | 9/2007 | Staiger | ...................... | H04L 1/22 700/4 |
| 7,562,211 B2* | 7/2009 | Paya | ................... | H04L 63/0428 380/277 |
| 2004/0162650 A1* | 8/2004 | Kueperkoch | ...... | B60G 17/0185 701/29.2 |
| 2006/0095230 A1* | 5/2006 | Grier | .................. | G05B 23/0216 702/183 |
| 2009/0150075 A1* | 6/2009 | Watanabe | ............ | G01C 21/005 701/472 |
| 2009/0292389 A1* | 11/2009 | Jung | ................... | G05B 19/0426 700/117 |
| 2015/0266409 A1* | 9/2015 | Akiyama | ................. | B60Q 1/12 701/49 |

* cited by examiner

*Primary Examiner* — Shardul Patel
(74) *Attorney, Agent, or Firm* — Burbage Law, P.C.; Jon-Michael Burbage; Elizabeth Ruzich

(57) ABSTRACT

The disclosure includes a system and method for providing security or fault tolerance support for an automobile or an element of an automobile. The system may include an automobile component that is communicatively coupled to a processor of an automobile. The automobile component may include a non-transitory memory storing data that is modifiable during a runtime by a middleware component of the automobile to cause the automobile to operate in compliance with one or more of a new security requirement and a new fault tolerance requirement. The data may be configured so that modification of the data affects performance of the automobile component relative to one or more of the new security requirement and the new fault tolerance requirement. The data may be modified by the middleware component at the runtime based on a set of predetermined configurations for the data that was determined at a design time.

25 Claims, 12 Drawing Sheets

AUTOMOBILE MODIFICATION SYSTEM PROVIDING SECURITY AND FAULT TOLERANCE SUPPORT

BACKGROUND

The specification relates to an automobile modification system providing security and fault tolerance support. For example, the specification relates to an automobile modification system that modifies one or more automobile components to provide security and fault tolerance support to an automobile.

Safety, security and performance requirements for automobiles change over time. For example, safety standards may change over time, security standards may change over time, performance standards may change over time or design specifications for the automotive system may change over time. As a result, automobile components that are installed in an automobile today may not meet the safety, security and performance requirements for automobiles at a later date, and thus be considered non-compliant with those requirements.

SUMMARY

An automotive system may be modified by an automobile modification system so that it is adaptable to changes in a standard or specification. For example, the automobile modification system may modify the automotive system so that it complies with a change in a standard (e.g., an automobile safety, security or performance standard that is related to the automotive system) or a change in a specification (e.g., a design specification, a performance specification or a requirements specification for a software-related automotive system). The automobile modification system may change the automotive system for other reasons.

In some implementations, the automobile modification system may modify the automotive system so that the automobile system that the fault tolerance for the automobile system is changed. For example, the fault tolerance for the automobile system may be increased or decreased. In another example, the automobile modification system may modify the computer code related to the fault tolerance of the automobile system so that this computer code is changed. Changing the computer code related to the fault tolerance of the automobile system may affect the fault tolerance of the automobile system. For example, the automobile system may be more fault tolerant or less fault tolerant.

Examples of an automotive system may include an automobile such as a car, truck, sport utility vehicle, etc. The automotive system may also include an onboard vehicle computer of an automobile or any other electronic component of the automobile. The automotive system may include an autonomous car or an automobile equipped with vehicle-to-vehicle communication.

Examples of the automobile modification system will now be described according to some embodiments.

A system of one or more processor may be configured to perform particular operations or actions by virtue of having software, firmware, hardware, or a combination of them installed on the system that in operation causes or cause the system to perform the actions.

One or more computer programs can be configured to perform particular operations or actions by virtue of including instructions that, when executed by a processor, cause the system to perform the actions. The processor may be an element of an onboard computer of an automobile or some other processor-based element of an automobile.

One general aspect includes a system include: an automobile component that is communicatively coupled to a processor of an automobile and a middleware component of the automobile. The automobile component includes a non-transitory memory storing modifiable data that is modifiable during a runtime by the middleware component of the automobile to cause the automobile to operate in compliance with one or more of a new security requirement and a new fault tolerance requirement. The modifiable data is configured so that modification of the modifiable data affects a performance of the automobile component relative to one or more of the new security requirement and the new fault tolerance requirement. The modifiable data is modified by the middleware component at the runtime based on a set of predetermined configurations for the modifiable data that was determined at a design time.

Implementations may include one or more of the following features.

The system where the automobile component may be selected from a set that includes: a plug-in component; a sensor; an engine control unit; a vehicle-to-vehicle communication device; a dedicated short range communication device; a software element stored on the non-transitory memory; and a processor-based computing device.

The system where the middleware component includes an instantiated combination of one or more software components and one or more hardware components that are configured to provide the automobile with fault tolerance support and security support.

The system where the one or more software components and the one or more hardware components are statically configured and implemented at the design time.

The system where the middleware component receives sensor data describing an environment of one or more of the automobile component and the automobile and the middleware component adaptively selects a configuration from the set of predetermined configurations based on (1) the sensor data and (2) requirement data describing one or more of the new security requirement and the new fault tolerance requirement.

One general aspect includes a method that includes: reading in a set of modifiable data from a plurality of elements of an automobile, wherein each of the plurality of the elements includes its own modifiable data stored in its own non-transitory storage medium included in a set of non-transitory storage mediums, wherein the set of modifiable data is modifiable during a runtime to cause the automobile to operate in compliance with one or more of a security requirement and a fault tolerance requirement; determining that the plurality of elements includes a plug-in component based on a presence of new modifiable data being present in the set of modifiable data; analyzing the plug-in component to determine whether an operation of the plug-in component would violate a timing constraint or a resource constraint; determining, for each element included in the plurality of elements of the automobile, an update for the set of modifiable data, wherein the update is configured to cause the plug-in component to operate while communicatively coupled to a processor of the automobile without violating the timing constraint or the resource constraint or causing any of the plurality of elements of the automobile to violate the security requirement or the fault tolerance requirement; modifying each of the non-transitory storage mediums included in the set of non-transitory storage mediums at the runtime so that they store the update; and operating the plug-in component while the plug-in component is communicatively coupled to a processor of the automobile.

One general aspect includes a system including: an automobile including a processor; an adaptive automobile hardware component; and an adaptive automobile middleware component that is communicatively coupled to the processor and the adaptive automobile hardware component. The adaptive automobile hardware component, which is communicatively coupled to the processor and the adaptive automobile middleware component, is a processor-based device of the automobile that includes a first security add-on, a first fault tolerance add-on and a first data structure storing a first characteristic property and a first configurable parameter.

The first characteristic property includes a first timing setting that affects a first timing of a first process associated with functionality provided responsive to operation of the adaptive automobile hardware component.

The first configurable parameter includes one or more of the following: a first security setting that affects functionality provided by the first security add-on responsive to operation of the adaptive automobile hardware component; and a first fault tolerance setting that affects functionality provided by the first fault tolerance add-on responsive to operation of the adaptive automobile hardware component.

The first data structure is configured so that execution of the adaptive automobile middleware component by the processor enables the processor to access and modify one or more of the following: the first characteristic property which modifies, during a runtime, the first timing of the first process; and the first configurable parameter which modifies, during the runtime, one or more of the first security setting and the first fault tolerance setting. Other embodiments of this aspect include corresponding computer systems, system, and computer programs recorded on one or more computer storage devices, each configured to perform the actions of the methods.

Implementations may include one or more of the following features.

The system where the adaptive automobile middleware component includes instructions that, responsive to being executed by the processor, causes the processor to: identify at a runtime, based on automobile requirement data that describes a new requirement for the automobile, a presence of a new requirement for the automobile; determine, based on first sensor data describing the operation of the adaptive automobile hardware component, whether the operation of the adaptive automobile hardware component yields first sensor data that complies with the new requirement; select, from first modification data describing a first set of predetermined configurations for the first characteristic property and the first configurable parameter that were determined at a design time, a first selected configuration that is configured to cause the adaptive automobile hardware component to operate in compliance with the new requirement during the runtime as indicated by yielding new sensor data that complies with the new requirement; and modify the first data structure so that it stores data for the first characteristic property and the first configurable parameter that is consistent with the first selected configuration and modifies at least one of the first characteristic property and the first configurable parameter.

The system where an adaptive automobile software component is communicatively coupled to the processor and the adaptive automobile middleware component. The adaptive automobile software component may include a second security add-on, a second fault tolerance add-on and a second data structure storing a second characteristic property and a second configurable parameter. The second characteristic property may also include a second timing setting that affects a second timing of a second process associated with functionality provided responsive to execution of the adaptive automobile software component. The second configurable parameter may also include one or more of the following: a second security setting that affects functionality provided by the second security add-on responsive to execution of the adaptive automobile software component; and a second fault tolerance setting that affects functionality provided by the second fault tolerance add-on responsive to execution of the adaptive automobile software component. The second data structure may be configured so that execution of the adaptive automobile middleware component by the processor enables the processor to access and modify one or more of the following: a second characteristic property which modifies, during the runtime, the second timing of the second process; and the second configurable parameter which modifies, during the runtime, one or more of the second security setting and the second fault tolerance setting.

The system where the adaptive automobile middleware component includes further instructions that, responsive being executed by the processor, causes the processor to: determine, based on second sensor data which describes the execution of the adaptive automobile software component, whether the execution of the adaptive automobile software component yields second sensor data that complies with the new requirement; select, from second modification data describing a second set of predetermined configurations for the second characteristic property and the second configurable parameter that were determined the design time, a second selected configuration that is configured to cause the adaptive automobile software component to execute in compliance with the new requirement during the runtime as indicated by yielding additional sensor data that complies with the new requirement for the adaptive automobile software component; and modify the second data structure so that it stores data for the second characteristic property and the second configurable parameter that is consistent with the second selected configuration and modifies at least one of the characteristic property and the configurable parameter. Implementations of the described techniques may include hardware, a method or process, or computer software on a computer-accessible medium.

One general aspect includes a method including: determining, by an adaptive automobile middleware component being executed by a processor of an automobile, a presence of a new plug-in component being communicatively coupled to the processor, where the new plug-in component includes a first security add-on, a first fault tolerance add-on and a first data structure; determining, based on automobile requirement data that describes a safety requirement and a fault tolerance requirement for elements of the automobile, a first characteristic property that includes a first timing setting that affects a first timing of a first process associated with functionality provided responsive to operation of the new plug-in component; determining, based on the automobile requirement data, a first configurable parameter that includes one or more of the following: a first security setting that affects functionality provided by the first security add-on responsive to operation of the new plug-in component; and a first fault tolerance setting that affects functionality provided by the first fault tolerance add-on responsive to operation of the new plug-in component. The method also includes modifying a first data structure included in the new plug-in component so that the new plug-in component operates based on the first characteristic property and the first configurable parameter. The method also includes determining, based on the automobile requirement data and an estimation of how the first characteristic property and the first configurable parameter affect the operation of the automobile relative to the safety requirement and the fault tolerance requirement for the elements of the automobile, modifications for (1) a set of second characteristic parameters that affect timing of operations for one or more other elements of the automobile that do not include the new plug-in component and (2) a set of second configurable parameters that affect one or more second security settings and one or more second fault tolerance settings for the other parameters for the automobile, where the modifications are configured to cause the other elements to operate in compliance with the safety requirement and the fault tolerance requirement while the plug-in component is an element of the automobile. The method also includes updating a set of second data structures associated with the other elements of the automobile so that the set of second data structures stores data that is consistent with the modifications for the set of second characteristic parameters and the set of second configurable parameters. The method also includes operating the new plug-in component. Other embodiments of this aspect include corresponding computer systems, system, and computer programs recorded on one or more computer storage devices, each configured to perform the actions of the methods.

One general aspect includes an automobile component that is communicatively coupled to a processor of an automobile, where the automobile component includes a non-transitory memory storing data that is modifiable during a runtime by a middleware component of the automobile to cause the automobile to operate in compliance with one or more of a new security requirement and a new fault tolerance requirement, where the data is configured so that modification of the data affects a performance of the automobile component relative to one or more of the new security requirement and the new fault tolerance requirement, and where the data is modified by the middleware component at the runtime based on a set of predetermined configurations for the data that was determined at a design time.

Other embodiments of this aspect include corresponding computer systems, system, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
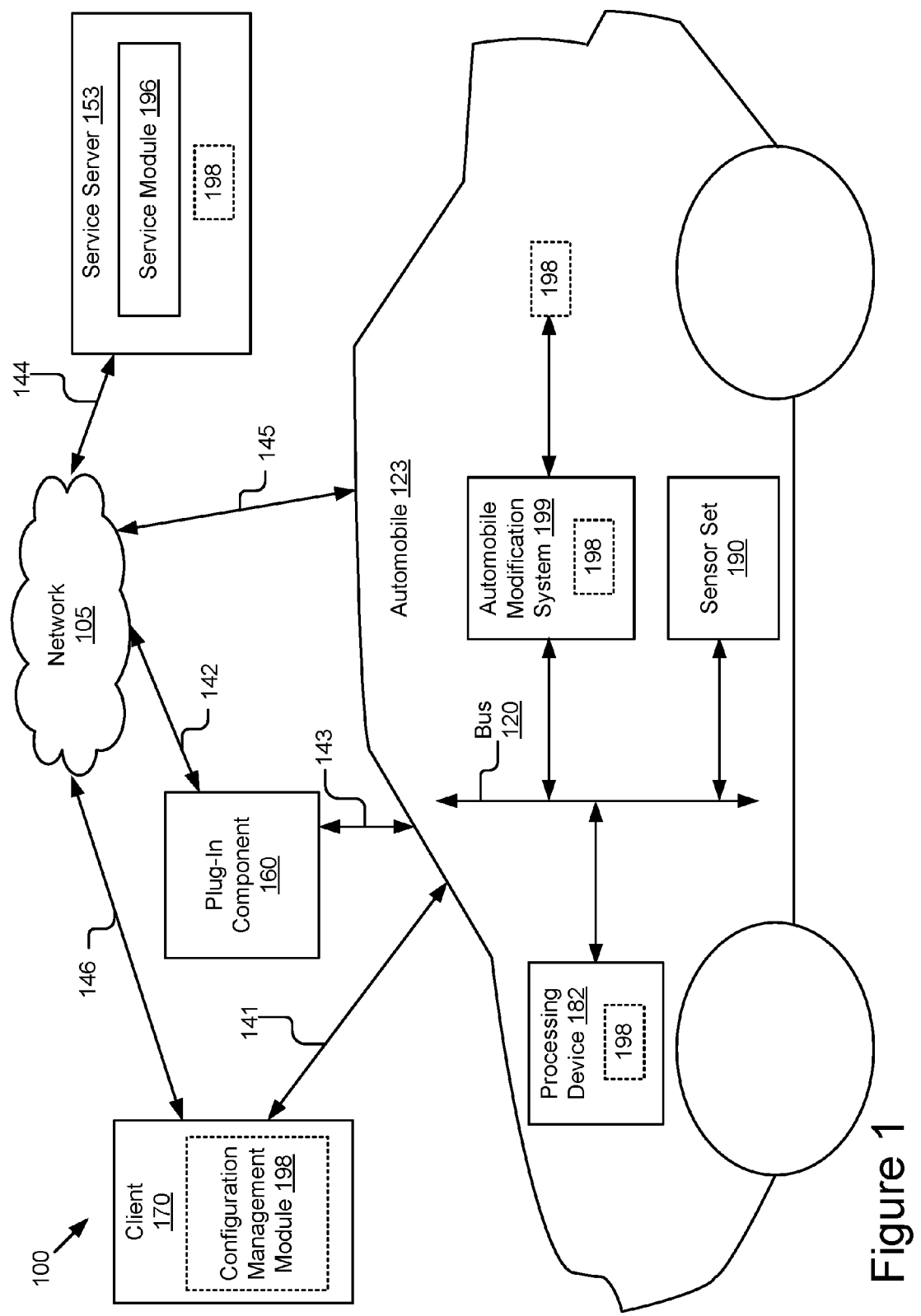
FIG. 1 is a block diagram illustrating an operating environment for implementing an automobile modification system.

FIG. 1 is a block diagram illustrating an example operating environment 100 for implementing an automobile modification system 199. The operating environment 100 may include one or more of the following: an automobile 123; a client 170; a plug-in component 160; and a service server 153. The operating environment 100 may include other servers or devices not shown in FIG. 1 including, for example, a traffic server for providing traffic data, a weather server for providing weather data, and a map server for providing map data, a social network server for providing a social network service; etc.

In some implementations, these entities of the operating environment 100 may be communicatively coupled via a network 105. The client 170 may be communicatively coupled to the network 105 via a signal line 146. The plug-in component 160 may be communicatively coupled to the network 105 via a signal line 142. The automobile 123 may be communicatively coupled to the network 105 via a signal line 145. The service server 153 may be communicatively coupled to the network 105 via a signal line 144. In addition, the client 170 may be communicatively coupled to the automobile 123 via a signal line 141 and the plug-in component 160 may be communicatively coupled to the automobile 123 via a signal line 143. Each of the signal lines 141, 142, 143, 144, 145, 146 may represent a wired connection or a wireless connection (e.g., millimeter wave communication, dedicated short range communication (DSRC), wireless fidelity (Wi-Fi), cellular (e.g., 3G, 4G, LTE, etc.), Bluetooth®, etc.) between devices and the network or devices and other devices.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. The network 105 may also include functionality or hardware to support cellular communications between entities of the operating environment 100.

The client 170 may be a computing device that includes a memory and a processor, for example, a server, a laptop computer, a desktop computer, a tablet computer, a mobile telephone, a personal digital assistant ("PDA"), a mobile e-mail device, a portable game player, a portable music player, a road side unit ("RSU"), an onboard-unit ("OBU"), a television with one or more processors embedded therein or coupled thereto, or other electronic device capable of accessing the network 105. A user may interact with the client 170. For example, a human user may provide inputs to the client 170 via a peripheral (e.g., a mouse, a keyboard, a touch-sensitive input device, a microphone, a camera, etc.) or receive data or information from the client 170 via a peripheral (e.g., a monitor, a display, a speaker, etc.).

The client 170 may include a configuration management module 198. In some embodiments, the configuration management module 198 may include code and routines configured to enable the automobile modification system 199 to modify one or more components of the automobile 123. For example, the configuration management module 198 may be stored on a memory and executed by a processor. Responsive to being executed by the processor, the configuration management module 198 may cause the processor to perform steps including, for example, determining the present configuration of one or more components of the automobile 123, determining whether the present configuration of one or more components of the automobile 123 will be changed and taking steps to reconfigure one or more of the components of the automobile 123.

In some embodiments, the configuration management module 198 may be an element of the automobile 123, a processing device 182 included in the automobile 123; an automobile modification system 199 included in the automobile or the service server 153. In some embodiments, one or more of the client 170, the automobile 123, the automobile modification system 199 and the service server 153 may include: (1) a memory that stores and executes some or all of the code and routines that are included in the configuration management module 198; and (2) a processor for executing the code and routines stored on the memory.

The configuration management module 198 will be described in more detail below with reference to one or more of FIGS. 2A, 2B, 3, 4A, 4B, 4C, 4D, 5A, 5B and 5C.

The service server 153 may include a computing device that includes a memory and a processor, for example, a server, a laptop computer, a desktop computer, a tablet computer, a mobile telephone, a PDA, a mobile e-mail device, a portable game player, a portable music player, a television with one or more processors embedded therein or coupled thereto, or other electronic device capable of accessing the network 105.

The service server 153 may include a hardware server. The service server 153 may include a memory storing server software and a processor for executing the server software.

The service server 153 may include a service module 196. The service module 196 may include code and routines for providing a service to the automobile 123 or the client 170. The service may include any online service that is accessible by the client 170 or an infotainment system or navigation system of the automobile 123. The service may include a social network service, an electronic calendar service, an electronic mapping or navigation service, a local business directory service, a content streaming service, etc.

The automobile 123 may include any road vehicle. For example, the automobile may include a car, a truck, an SUV, a bus, a semi-trailer truck or any roadway conveyance that is powered by one or more of an internal combustion engine, an electric motor and a hydrogen-powered motor.

The automobile may include one or more of the following: a processing device 182; an automobile modification system 199; and a sensor set 190. The processing device 182, automobile modification system 199 and the sensor set 190 may be communicatively coupled to one another via a bus 120.

In some embodiments, the processing device 182 may include any processor-based computing device that is specially configured to provide functionality to the automobile 123. For example, the processing device 182 may include a special-purpose computing device such as an onboard vehicle computer, an engine control unit, a vehicle infotainment system or a vehicle navigation system. In some embodiments, the processing device 182 is not a general purpose computer.

The automobile modification system 199 may include hardware and software for reconfiguring one or more hardware or software components of the automobile 123. The automobile modification system 199 will be described in more detail below with reference to one or more of FIGS. 2A, 2B, 3, 4A, 4B, 4C, 4D, 5A, 5B and 5C. For example, one or more of the automobile modification system 199 and the configuration management module 198 may be configured to execute one or more of the steps of the method 500 described below with reference to FIGS. 5A, 5B and 5C.

The sensor set 190 may include one or more automobile sensors. For example, the sensor set 190 may include one or more of the following: a camera; a LIDAR sensor; a laser altimeter; a navigation sensor (e.g., a global positioning system (GPS) sensor); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensors.

In some implementations, one or more of the configuration management module 198 or the automobile modification system 199 may be implemented using hardware including a field-programmable gate array ("FPGA") or an application-specific integrated circuit ("ASIC"). In some other implementations, one or more of the configuration management module 198 and the automobile modification system 199 may be implemented using a combination of hardware and software. One or more of the configuration management module 198 and the automobile modification system 199 may be stored in a combination of the devices (e.g., servers or other devices), or in one of the devices.

The plug-in component 160 may include a plug-in hardware component, a plug-in software component or a component that is a combination of hardware and software. For example, the plug-in component 160 may include a hardware dongle that is communicatively coupled to an element of the automobile 123 such as the processing device 182 (e.g., an onboard vehicle computer). The automobile 123 may or may not include drivers or other components necessary for implementing the plug-in component 160.

In some embodiments, the plug-in component 160 may include one or more of an adaptive automobile hardware component 130 and an adaptive automobile software component 134 as described below with reference to FIG. 2A.

Figure 2A:
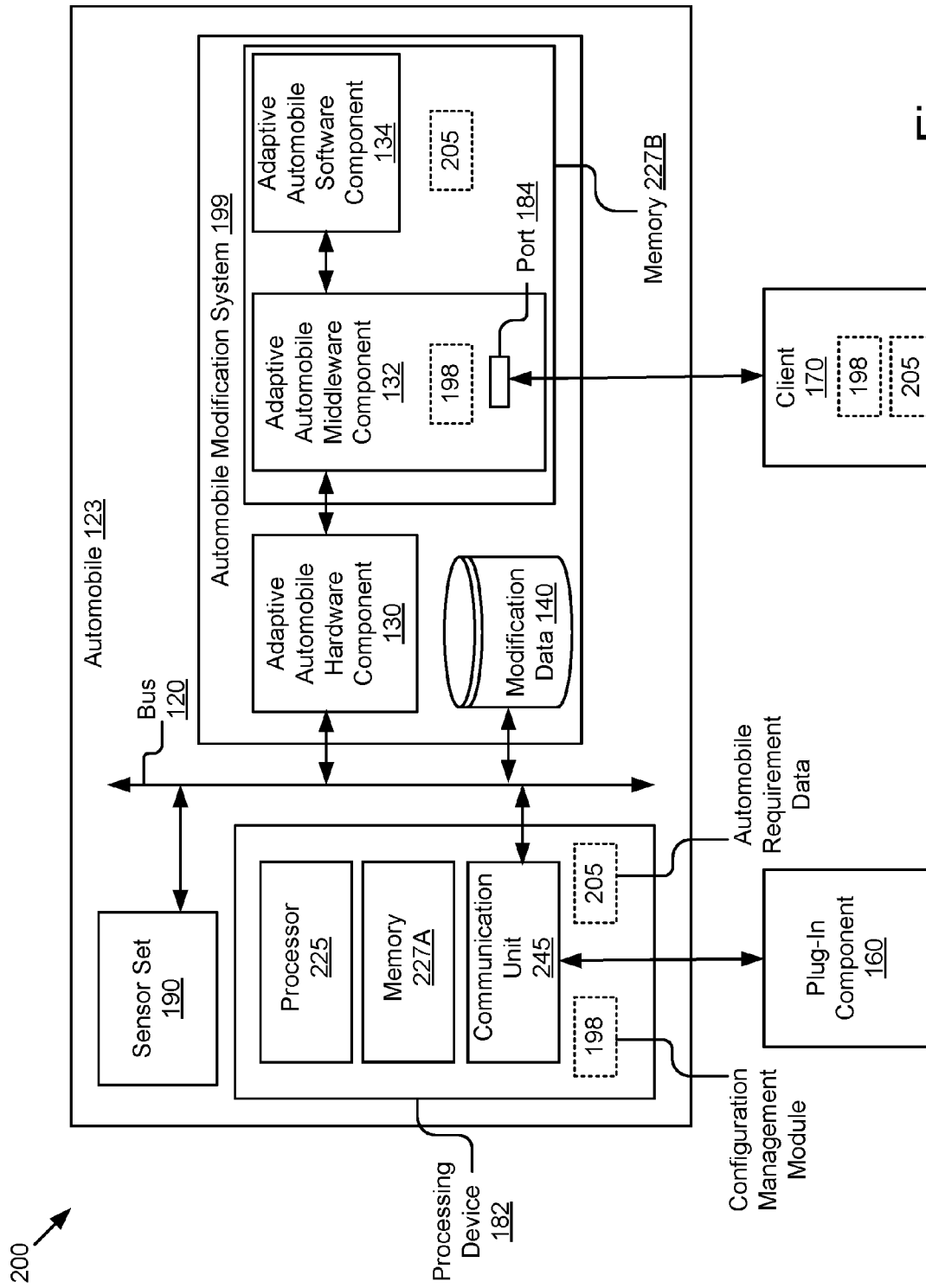
FIG. 2A is a block diagram illustrating an example system for implementing an automobile modification system.

Referring now to FIG. 2A, an example system 200 for implementing an automobile modification system 199 is shown. The system 200 includes one or more of the following: an automobile 123; a plug-in component 160; and a client 170. The plug-in component 160 and the client 170 were described above with reference to FIG. 1, and so, these descriptions will not be repeated here.

The automobile 123 may include one or more of the following: the sensor set 190; the processing device 182; and the automobile modification system 199. The processing device 182 and the automobile modification system may be communicatively coupled to one another via the bus 120.

The processing device 182 may include one or more of the following: a processor 225; a memory 227A; a communication unit 245; the configuration management module 198; and the automobile requirement data 205.

The processor 225 includes an arithmetic logic unit, a microprocessor, a general-purpose controller, or some other processor array to perform computations. In some implementations, the processor 225 may provide electronic display signals to a display device. The processor 225 processes data signals and may include various computing architectures including a complex instruction set computer (CISC) architecture, a reduced instruction set computer (RISC) architecture, or an architecture implementing a combination of instruction sets. The processor 225 may include a graphical processing unit. Although FIG. 2A includes a single processor 225, multiple processors 225 may be included. Other processors, operating systems, sensors, displays, and physical configurations may be possible.

The memory 227A may be a non-transitory computer-readable storage medium. The memory 227A stores instructions or data that may be executed by the processor 225. The instructions or data may include code for performing the techniques described herein. The memory 227A may be a dynamic random access memory (DRAM) device, a static random access memory (SRAM) device, flash memory, or some other memory device. In some implementations, the memory 227A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227A may store some or all of the data needed by the configuration management module 198 or the automobile modification system 199 to perform their functions.

The communication unit 245 transmits and receives data to and from elements of the operating environment 100 described above with reference to FIG. 1. The communication unit 245 is coupled to the bus 120. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with one or more elements of the operating environment 100 using one or more wireless communication methods, including IEEE 802.11, IEEE 802.11p, IEEE 802.16, IEEE 1609.1, IEEE 1609.2, IEEE 1609.3, IEEE 1609.4, Bluetooth®, or any other suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 may also provide other conventional connections to the network 105 for distribution of files or media objects using standard network protocols including TCP/IP, HTTP, HTTPS, and SMTP, etc.

The configuration management module 198 may include code and routines configured to modify one or more parameters or properties of one or more components of the automobile 123. For example, the component may no longer comply with a safety requirement for the automobile 123, a security requirement for the automobile or a performance requirement for the automobile 123.

The communication unit 245 may receive the automobile requirement data 205. The automobile requirement data 205 may describe one or more requirements for the automobile 123 or one or more components of the automobile 123. For example, the automobile requirement data 205 may describe one or more safety specifications, one or more security specifications or one or more design specifications. The safety specifications, security specifications or design specifications may describe one or more safety requirements, one or more security requirements or one or more performance requirements for the components of the automobile 123, respectively.

The components of the automobile 123 may include any hardware or software included in the automobile 123 which includes (1) one or more characteristic properties or (2) one or more configurable parameters. The characteristic properties and configurable parameters are described below, for example, with reference to one or more of FIGS. 2B, 4A, 4B, 4C and 4D.

The communication unit 245 may store the automobile requirement data 205 in the memory 227A of the processing device 182 or the memory 227B of the automobile modification system 199.

The configuration management module 198 may analyze the automobile requirement data 205 and determine one or more of the following: (1) which components of the automobile 123 are affected by the one or more requirements described by the automobile requirement data 205; (2) whether the to modify the configurable parameters or characteristic properties of the affected components; and (3) how to modify the configurable parameters or characteristic properties of the affected components. The configuration management module 198 may take steps to modify the configurable parameters or characteristic properties of the affected components so that the affected components comply some or all of the requirements described by the automobile requirement data 205.

As will be described in more detail below, the configuration management module 198 may modify the configurable parameters or characteristic properties of the affected components based on the modification data 140 that describes one or more candidates for how to modify the configurable parameters or characteristic properties of the affected components so that the affected components comply with the automobile requirement data 205. For example, the configuration management module 198 may analyze the modification data 140 and determine how to modify the configurable parameters or characteristic properties of the affected components so that the affected components comply with the one or more requirements described by the automobile requirement data 205.

In some embodiments, the communication unit 245 may receive sensor data (see, e.g., element 299 of FIG. 2B) describing one or more measurements detected or determined by one or more of the sensors included in the sensor set 190. The one or more measurements may describe the current state or environment of one or more of the following: the automobile 123; the adaptive hardware component 130; and the adaptive automobile software component 134.

In some embodiments, the configuration management module 198 may analyze the automobile requirement data 205 and the sensor data and determine one or more of the following: (1) which components of the automobile 123 are affected by the one or more requirements described by the automobile requirement data 205; (2) whether the to modify the configurable parameters or characteristic properties of the affected components; and (3) how to modify the configurable parameters or characteristic properties of the affected components. The configuration management module 198 may take steps to modify the configurable parameters or characteristic properties of the affected components so that the affected components comply some or all of the requirements described by the automobile requirement data 205.

The automobile modification system 199 may include one or more of the following: one or more adaptive automobile hardware components 130; one or more adaptive automobile middleware components 132; one or more adaptive automobile software components 134; the modification data 140. The automobile modification system 199 may include automobile requirement data 205.

The adaptive automobile middleware component 132, adaptive automobile software component 134 and the automobile requirement data 205 may be stored on a memory 227B. The memory 227B may be a non-transitory computer-readable storage medium. The memory 227B stores instructions or data that may be executed by the processor 225 of the processing device 182 or a processor of the automobile modification system 199, which is an optional feature of the automobile modification system 199 that is not pictured. The instructions or data may include code for performing the techniques described herein. The memory 227B may be a dynamic random access memory (DRAM) device, a static random access memory (SRAM) device, flash memory, or some other memory device. In some implementations, the memory 227B also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227B may store some or all of the data needed by the configuration management module 198 or the automobile modification system 199 to perform their functions.

Figure 2B:
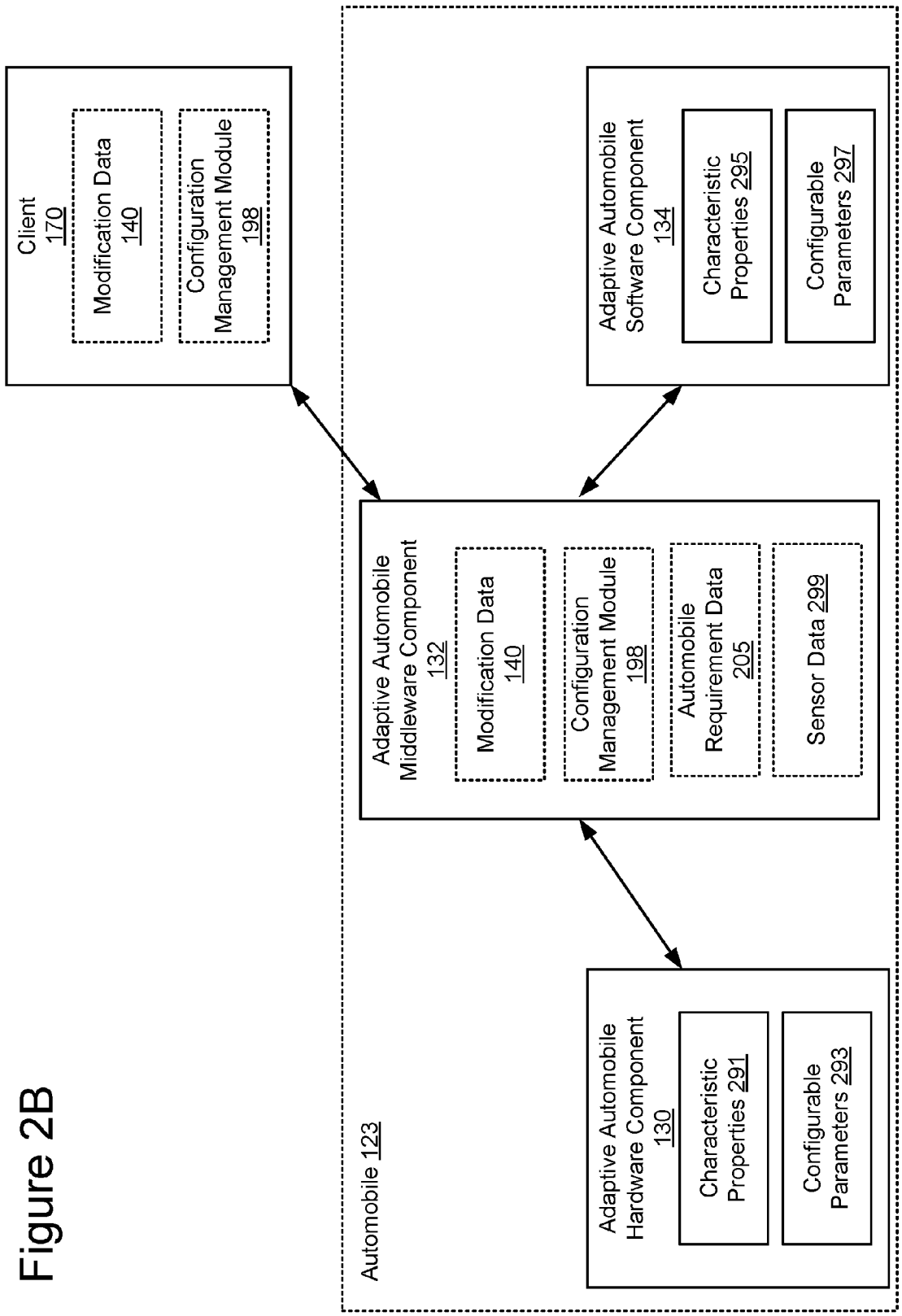
FIG. 2B is a block diagram illustrating example embodiments for an adaptive automobile hardware component, an adaptive automobile middleware component and an automobile software component.
Figure 4A:
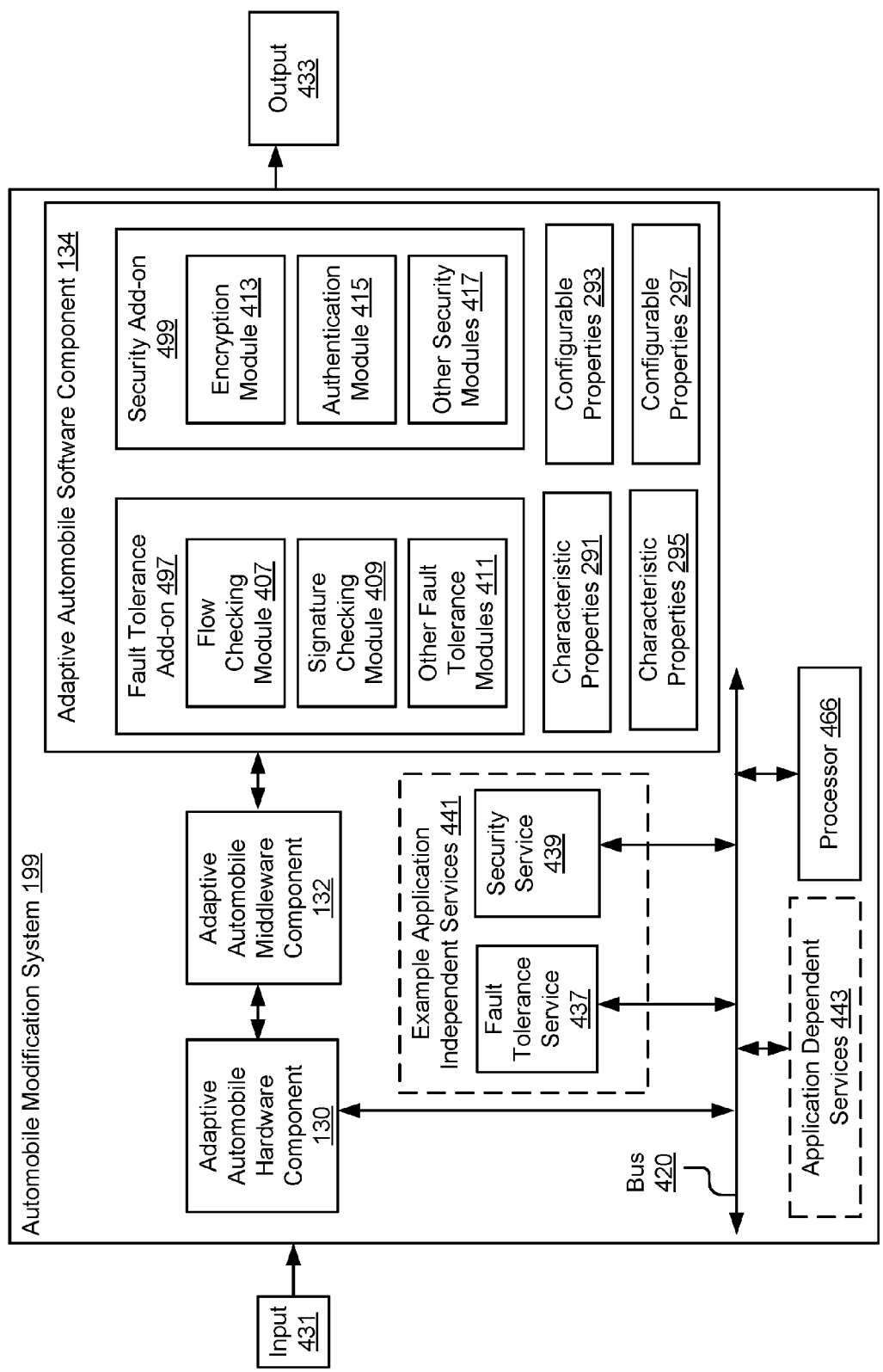
FIG. 4A is a block diagram illustrating an example embodiment of an automobile modification system receiving an input and determining an output responsive to the input.

The adaptive automobile hardware component 130 may include any hardware component of the automobile 123 that includes one or more characteristic properties or one or more configurable parameters. An example of the adaptive automobile hardware component 130 is depicted in FIGS. 2B and 4C.

In some embodiments, the adaptive automobile hardware component 130 is not a conventional automobile hardware component. For example, although a sensor may be an automobile hardware component, it is not an adaptive automobile hardware component 130 unless it includes one or more characteristic properties or one or more configurable parameters that are modifiable by the adaptive automobile middleware component 132.

In some embodiments, the adaptive automobile hardware component 130 is an automobile hardware component that has been specially designed and manufactured to operate with one or more of the configuration management module 198, the adaptive automobile middleware component 132 and the adaptive automobile software component 134. For example, the adaptive automobile hardware component 130 may include an automobile sensor, onboard computer, engine control unit ("ECU"), vehicle-to-vehicle communication device ("V2V communication device"), dedicated short-range communication device ("DSRC communication device") or some other automobile hardware element that has been specifically designed to include one or more characteristic properties or configurable parameters that are modifiable by the adaptive automobile middleware component 132. The automobile 123 may include a plurality of adaptive automobile hardware components 130.

The adaptive automobile software component 134 may include any software component of the automobile 123 that includes one or more characteristic properties, one or more configurable parameters, one or more fault tolerance add-ons or one-or more security add-ons. An example of the adaptive automobile hardware component 130 is depicted in FIGS. 2B and 4A. The characteristic properties and configurable parameters are described below with reference to FIG. 2A. The fault tolerance add-on and the security add-on as described below with reference to FIG. 4B.

In some embodiments, the adaptive automobile software component 134 is not a conventional automobile software component. For example, although the software for a sensor may be an automobile software component, it is not an adaptive automobile software component 134 unless it includes one or more characteristic properties or one or more configurable parameters that are modifiable by the adaptive automobile middleware component 132. The software may also be required to include a fault tolerance add-on or a security add-on before being an adaptive automobile software component 134.

As will be explained in more detail below, in some embodiments the adaptive automobile software component 134 is an automobile software component that has been specially designed and manufactured to operate with one or more of the configuration management module 198, the adaptive automobile middleware component 132 and the adaptive automobile hardware component 130. For example, the adaptive automobile software component 134 may include software or firmware included in an automobile sensor, onboard computer, engine control unit or some other automobile software element that has been specifically designed to include one or more characteristic properties or configurable parameters that are modifiable by the adaptive automobile middleware component 132. The adaptive automobile software component 134 may also be specifically designed to include one or more fault tolerance add-ons or one or more security add-ons. The automobile 123 may include a plurality of adaptive automobile software components 134.

The adaptive automobile hardware component 130 and the adaptive automobile software component 134 enable the designs of the automobile 123 to include durable security and fault tolerance support for the automobile 123 since the configurable parameters and the characteristic properties are modifiable by the adaptive automobile middleware component 132 based on automobile requirement data 205 that indicates new requirements for the adaptive automobile hardware component 130 or the adaptive automobile software component 134.

The adaptive automobile middleware component 132 includes code and routines configured to provide one or more of the following: (1) modify or reconfigure one or more configurable parameters of the adaptive automobile hardware component 130 or the adaptive automobile software component 134 so that the adaptive automobile hardware component 130 complies with one or more requirements described by the automobile requirement data 205; (2) modify or reconfigure one or more characteristic properties of the adaptive automobile hardware component 130 or the adaptive automobile software component 134 so that the adaptive automobile software component 134 complies with one or more requirements described by the automobile requirement data 205; and (3) provide support for one or more plug-in components 160 so that the one or more plug-in components 160 are operable with one or more of the processing device 182, the adaptive automobile hardware component 130 and the adaptive automobile software components 134.

The modification data 140 may describe one or more predetermined configurations for one or more characteristic properties or one or more configurable parameters of one or more components 130, 134 that are not compliant with one or more requirements described by the automobile requirement data 205. For example, the configuration management module 198 may determine, based on the automobile requirement data 205 and the present state of the one or more components 130, 134 (e.g., based on analysis of sensor data received from the sensor set 190. The sensor data may describe the current environment for the automobile 123 or one or more of the elements of the automobile 123.

In some embodiments, the modification data 140 may include one or more look-up tables describing one or more configurations for different levels of fault tolerance and different levels of security for one or more of the components 130, 134.

In some embodiments, the adaptive automobile middleware component 132 may adaptively select a configuration from the modification data 140 based on one or more of the current environment (e.g., as described by the sensor data) and the required levels of security or fault tolerance (e.g., as described by the automobile requirement data 205). The adaptive automobile middleware component 132 may select a configuration that does not provide the highest level of security or fault tolerance at all times so that computational overhead for the automobile 123 is reduced and performance for the automobile 123 is increased. For example, selection of a configuration may be configured to not provide a highest level of security or a highest level of fault tolerance so that a computational overhead for the processor 225 is reduced or a performance level for the processor 225 is increased or maintained In some embodiments, the adaptive automobile middleware component 132 may provide support for the plug-in component 160 by performing or causing to be performed one or more of the following steps: (1) detect how the plug-in component 160 changes the processing device 182, the adaptive automobile hardware component 130, the adaptive automobile software component (or some other hardware or software of the automobile 123); and (2) disabling the automobile 123 until the automobile 123 is connected to the client 170 or some other processor-based computing device including the configuration management module 198.

The configuration management module 198 (or the plug-in component support module 461 described below with reference to FIG. 4D) may include a real time scheduling analysis system. The configuration management module 198 may complete set-up of the plug-in component 160 by performing one or more of the following steps: (1) determine the schedulability of providing support for the plug-in component 160; (2) assign one or more scheduling parameters for providing support for the plug-in component 160; (3) reconstruct a look-up table included in the modification data 140 containing one or more configurations for different fault tolerance and security levels for the plug-in component 160. If the automobile 123 becomes un-schedulable by addition of the plug-in component 160, the configuration management module 198 may provide a warning to a user of the automobile 123 or the automobile 123 may remain disabled until the scheduling problem is resolved.

In some embodiments, the configuration management module 198 may execute one or more of the following steps: (1) read one or more characteristic properties 291, 295 or configurable parameters 293, 297 from the automobile modification system 199; (2) determine based on the one or more characteristic properties 291, 295 or configurable parameters 293, 297 whether a plug-in component 160 (which may be a new plug-in component) is communicatively coupled to the bus 420; (3) responsive to identifying the presence of a new plug-in component 160, call a schedulability analysis algorithm; (4) execute the schedulability analysis algorithm to analyze the schedulability of the new plug-in component and thereby determine whether the new plug-in component 160 violates a timing or resource constraint (e.g., as described by the automobile requirement data 205 or some other data stored by the automobile 123 or client 170 that describes timing or resource constraints such as characteristic properties or configurable parameters in some embodiments,); (5) if the timing and resource constraints are not violated, determine that the automobile modification system 199 is schedulable with the addition of the new plug-in component and assign one or more scheduling parameters to the new plug-in component 160 so that it is successfully implemented in the automobile modification system 199; (6) if either the timing or resource constraints are violated, determine that the automobile modification system 199 is not schedulable with the addition of the new plug-in component 160, then (a) determine one or more updates for a look-up table included in the modification data 140 containing one or more configurations for different fault tolerance and security levels for the elements of the automobile modification system 199 including the new plug-in component 160, wherein the updates are configured to enable the new plug-in component to operate in the automobile modification system 199 without violating the timing or resource constraints; (b) reconstruct the look-up table included in the modification data 140 based on the updates; (c) assign the new configurations described by the look-up table to each component of the automobile modification system 199; and (d) determine that the automobile modification system 199 is schedulable with the addition of the new plug-in component 160 and the reconstructed look-up table and assign one or more scheduling parameters to the new plug-in component 160 so that it is successfully implemented in the automobile modification system 199. See, for example, FIG. 6.

In some embodiments, the client 170 may be communicatively coupled to the automobile modification system 199 via a port 184 included in the adaptive automobile middleware component 132.

In some embodiments, the automobile 123 may be an autonomous or semi-autonomous automobile.

Referring now to FIG. 2B, depicted is a block diagram illustrating example embodiments for an adaptive automobile hardware component 130, an adaptive automobile middleware component 132 and an automobile software component 134.

As depicted in FIG. 2B, the automobile 123 may include one or more of the following: the adaptive automobile hardware component 130; the adaptive automobile middleware component 132; and the adaptive automobile software component 134. The adaptive automobile middleware component 132 may be communicatively coupled to the client 170.

The adaptive automobile hardware component 130 may include one or more of the following: (1) a characteristic property 291 associated with the adaptive automobile hardware component 130; and (2) a configurable parameter 293 associated with the adaptive automobile hardware component 130.

Examples of adaptive automobile hardware components 130 may include processor-based computing devices, busses and sensors that include one or more characteristic properties 291 or one or more configurable parameters 293.

In some embodiments, the characteristic properties 291 may relate to the options or settings for the timing of operations associated with the adaptable automobile hardware component 130. For example, characteristic properties 291 associated with the adaptive automobile hardware component 130 may include one or more of the following examples: a frequency setting used for a processor-based computing device or a bus included in the automobile 123 and configured so that it is modifiable by the adaptive automobile middleware component 132; a bandwidth setting used for a processor-based computing device or a bus included in the automobile 123 and configured so that it is modifiable by the adaptive automobile middleware component 132; and a sensing rate setting used for a sensor included in the automobile 123 and configured so that it is modifiable by the adaptive automobile middleware component 132.

The adaptive automobile hardware component 130 may include one or more characteristic properties 291 associated with the adaptive automobile hardware component 130.

The adaptive automobile middleware component 132 may include code and routines configured to modify the one or more characteristic properties 291 associated with the adaptive automobile hardware component 130 so that the adaptive automobile hardware component 130 operates in accordance with one or more requirements for the adaptive automobile hardware component 130 as described by the automobile requirement data 205. For example, the adaptive automobile hardware component 130 may include a table or some other data structure that includes settings for the one or more characteristic properties 291 associated with the adaptive automobile hardware component 130. The adaptive automobile middleware component 132 may access and modify these settings to effect a modification of the one or more characteristic properties 291 associated with the adaptive automobile hardware component 130.

In some embodiments, access to the table or data structure that enables modification of the one or more characteristic properties 291 associated with the adaptive automobile hardware component 130 may be restricted using some encryption method and the adaptive automobile middleware component 132 may include the data or information necessary to access and modify the data or settings stored in the table or data structure. In some embodiments, the adaptive automobile middleware component 132 may be only entity that is configured to access and modify the table or data structure that enables modification of the one or more characteristic properties 291 associated with the adaptive automobile hardware component 130.

In some embodiments, the configurable parameters 293 may relate to the options or settings for configuring the fault tolerance or security settings for the adaptable automobile hardware component 130. For example, the configurable parameters 293 associated with the adaptive automobile hardware component 130 may include one or more of the following examples: a period setting used for a processor-based computing device or a bus included in the automobile 123 and configured so that it is modifiable by the adaptive automobile middleware component 132; a transmission rate used for a processor-based computing device or a bus included in the automobile 123 and configured so that it is modifiable by the adaptive automobile middleware component 132; and a sampling rate setting used for a sensor included in the automobile 123 and configured so that it is modifiable by the adaptive automobile middleware component 132.

The adaptive automobile hardware component 130 may include one or more configurable parameters 293 associated with the adaptive automobile hardware component 130.

The adaptive automobile middleware component 132 may include code and routines configured to modify the one or more configurable parameters 293 associated with the adaptive automobile hardware component 130 so that the adaptive automobile hardware component 130 operates in accordance with one or more requirements for the adaptive automobile hardware component 130 as described by the automobile requirement data 205. For example, the adaptive automobile hardware component 130 may include a table or some other data structure that includes settings for the one or more configurable parameters 293 associated with the adaptive automobile hardware component 130. The adaptive automobile middleware component 132 may access and modify these settings to effect a modification of the one or more configurable parameters 293 associated with the adaptive automobile hardware component 130.

In some embodiments, access to the table or data structure that enables modification of the one or more configurable parameters 293 associated with the adaptive automobile hardware component 130 may be restricted using some encryption method and the adaptive automobile middleware component 132 may include the data or information necessary to access and modify the data or settings stored in the table or data structure. In some embodiments, the adaptive automobile middleware component 132 may be only entity that is configured to access and modify the table or data structure that enables modification of the one or more configurable parameters 293 associated with the adaptive automobile hardware component 130.

The adaptive automobile software component 134 may include one or more of the following: (1) a characteristic property 295 associated with the adaptive automobile software component 134; and (2) a configurable parameter 297 associated with the adaptive automobile software component 134.

In some embodiments, the characteristic properties 295 may relate to the options or settings for the timing of operations associated with the adaptable automobile software component 134. For example, the characteristic properties 295 associated with the adaptive automobile software component 134 may include one or more of the following: an activation period setting for the adaptive automobile software component 134 included in the automobile 123 and configured so that it is modifiable by the adaptive automobile middleware component 132; an estimated execution time setting for a fault tolerance add-on associated with the adaptive automobile software component 134 included in the automobile 123 (see, e.g., element 497 of FIG. 4B) and configured so that it is enabled and modifiable by the adaptive automobile middleware component 132; an estimated execution time setting for a security add-on for the adaptive automobile software component 134 included in the automobile 123 (see, e.g., element 499 of FIG. 4B) and configured so that it is enabled and modifiable by the adaptive automobile middleware component 132; and criticality data describing the criticality of the adaptive automobile software component 134 for operation of the automobile 123 in a matter that conforms with the safety, security or design requirements of the automobile 123 as defined by the automobile requirement data 205, wherein the criticality data is configured so that it is modifiable by the adaptive automobile middleware component 132.

The adaptive automobile software component 134 may include a plurality of characteristic properties 295 associated with the adaptive automobile software component 134.

The adaptive automobile middleware component 132 may include code and routines configured to modify the one or more characteristic properties 295 associated with the adaptive automobile software component 134 so that the adaptive automobile software component 134 operates in accordance with one or more requirements for the adaptive automobile software component 134 as described by the automobile requirement data 205. For example, the adaptive automobile software component 134 may include a table or some other data structure that includes settings for the one or more characteristic properties 295 associated with the adaptive automobile software component 134. The adaptive automobile middleware component 132 may access and modify these settings to effect a modification of the one or more characteristic properties 295 associated with the adaptive automobile software component 134.

In some embodiments, access to the table or data structure that enables modification of the one or more characteristic properties 295 associated with the adaptive automobile software component 134 may be restricted using some encryption method and the adaptive automobile middleware component 132 may include the data or information necessary to access and modify the data or settings stored in the table or data structure. In some embodiments, the adaptive automobile middleware component 132 may be only entity that is configured to access and modify the table or data structure that enables modification of the one or more characteristic properties 295 associated with the adaptive automobile software component 134.

The characteristic properties 295 associated with the adaptive automobile software component 134 may include any properties of the adaptive automobile software component 134 used during design time for mapping analysis or timing analysis for the adaptive automobile hardware component 130 or the adaptive automobile software component 134. In some embodiments, the adaptive automobile middleware component 132 may use one or more of the characteristic properties 295 associated with the adaptive automobile hardware component 130 or the adaptive automobile software component 134 to determine a feasibility of a plug-in component 160.

In some embodiments, the configurable parameters 297 may relate to the options or settings for configuring the fault tolerance or security settings for the adaptable automobile software component 134. The configurable parameters 297 associated with the adaptive automobile software component 134 may include one or more of the following: an execution setting indicating whether a redundant component (see, e.g., elements 489 or 484 of FIG. 4B) will be executed, wherein the execution setting is configured so that it is modifiable by the adaptive automobile middleware component 132; a parameter for a security controller (e.g., a key length for encryption, whether encryption is enabled, what type or level of encryption is used, etc.) included in the adaptive automobile software component 134 and configured so that it is enabled and modifiable by the adaptive automobile middleware component 132 (see, e.g., element 403 of FIG. 4B and the description for same); a parameter for a fault tolerance controller (e.g., a number of faults that will be allowed before a message is provided to the user or the faulty component or automobile 123 is disabled) included in the adaptive automobile software component 134 and configured so that it is enabled and modifiable by the adaptive automobile middleware component 132 (see, e.g., element 401 of FIG. 4B and the description for same); and criticality data describing the criticality of the adaptive automobile software component 134 for operation of the automobile 123 in a matter that conforms with the safety, security or design requirements of the automobile 123 as defined by the automobile requirement data 205, wherein the criticality data is configured so that it is modifiable by the adaptive automobile middleware component 132.

The adaptive automobile software component 134 may include a plurality configurable parameters 297 associated with the adaptive automobile software component 134.

The adaptive automobile middleware component 132 may include code and routines configured to modify the one or more configurable parameters 297 associated with the adaptive automobile software component 134 so that the adaptive automobile software component 134 operates in accordance with one or more requirements for the adaptive automobile software component 134 as described by the automobile requirement data 205. For example, the adaptive automobile software component 134 may include a table or some other data structure that includes settings for the one or more configurable parameters 297 associated with the adaptive automobile software component 134. The adaptive automobile middleware component 132 may access and modify these settings to effect a modification of the one or more configurable parameters 297 associated with the adaptive automobile software component 134.

In some embodiments, access to the table or data structure that enables modification of the one or more configurable parameters 297 associated with the adaptive automobile software component 134 may be restricted using some encryption method and the adaptive automobile middleware component 132 may include the data or information necessary to access and modify the data or settings stored in the table or data structure. In some embodiments, the adaptive automobile middleware component 132 may be only entity that is configured to access and modify the table or data structure that enables modification of the one or more configurable parameters 297 associated with the adaptive automobile software component 134.

The configurable parameters 297 associated with the adaptive automobile software component 134 may include any parameters of the adaptive automobile software component 134 used during design time for mapping analysis or timing analysis for the adaptive automobile s component 130 or the adaptive automobile software component 134. In some embodiments, the adaptive automobile middleware component 132 may use one or more of the configurable parameters 297 associated with the adaptive automobile hardware component 130 or the adaptive automobile software component 134 to determine a feasibility of a plug-in component 160.

The adaptive automobile middleware component 132 may include code and routines configured to modify the one or more characteristic properties 295 associated with the adaptive automobile software component 134 so that the adaptive automobile software component 134 operates in accordance with one or more requirements for the adaptive automobile software component 134 as described by the automobile requirement data 205.

The adaptive automobile middleware component 132 may include one or more of the following: modification data 140; configuration management module 198; automobile requirement data 205; and sensor data 299. The modification data 140, configuration management module 198 and the automobile requirement data 205 are described above with reference to FIG. 1 or 2A, and so, these descriptions will not be repeated here. The sensor data 299 may describe the current environment of the automobile 123 or one or more of the elements of the automobile 123 (e.g., elements 130, 291, 293, 134, 295, 297, 182, 120 or 190). The sensor data 299 may describe one or more measurements detected or determined by one or more of the sensors included in the sensor set 190 (see, e.g., element 190 of FIG. 1). The sensor data 299 may describe the performance of one or more elements of the automobile 123.

In some embodiments, the adaptive automobile middleware component 132 may be configured to execute one or more steps of the method 500 described below with reference to FIGS. 4A, 5B and 5C.

In some embodiments, the adaptive automobile middleware component 132 may receive the automobile requirement data 205. The adaptive automobile middleware component 132 may receive data describing one or more of the characteristic properties 291, 295. The adaptive automobile middleware component 132 may receive data describing one or more of the configurable parameters 293, 297. The adaptive automobile middleware component 132 may receive the sensor data 299. The adaptive automobile middleware component 132 may analyze the automobile requirement data 205 to determine whether a component 130, 134 of the automobile 123 has a new requirement that must be satisfied.

In some embodiments, the adaptive automobile middleware component 132 may adaptive automobile middleware component 132 may determine which component 130, 134 of the automobile 123 is affected by the new requirement. The adaptive automobile middleware component 132 may analyze the sensor data 299 to determine the performance or environment of the component 130, 134 of the automobile 123 that is affected by the new requirement. The adaptive automobile middleware component 132 may determine, based on one or more of the sensor data 299 and the automobile requirement data 205, that the new requirement is not met by the current performance or environment of the affected component 130, 134. The adaptive automobile middleware component 132 may analyze the modification data 140 to identify a new configuration or modifications for the one or more of the characteristic properties 291, 295 or one or more of the configurable parameters 293, 297 that, if implemented, would enable the affected component 130, 134 to operate in conformance with the new requirement. The adaptive automobile middleware component 132 may access one or more tables or data structures of the affected component 130, 134.

In some embodiments, the adaptive automobile middleware component 132 may modify the data or settings stored in the one or more tables or data structures of the affected component 130, 134 so that the identified new configuration or modification for the affected component 130, 134 is implemented.

In some embodiments, the adaptive automobile middleware component 132 may wait a period of time and then recheck the sensor data 299 to ensure that the implemented modification or new configuration caused the affected component 130, 134 to operate in compliance with the new requirement.

The client 170 may include the modification data 140 and the configuration management module 198.

In some embodiments, the adaptive the configuration management module 198 may be configured to execute one or more steps of the method 500 described below with reference to FIGS. 4A, 5B and 5C.

In some embodiments, the configuration management module 198 may receive the automobile requirement data 205. The configuration management module 198 may receive data describing one or more of the characteristic properties 291, 295. The configuration management module 198 may receive data describing one or more of the configurable parameters 293, 297. The configuration management module 198 may receive the sensor data 299. The configuration management module 198 may analyze the automobile requirement data 205 to determine whether a component 130, 134 of the automobile 123 has a new requirement that must be satisfied.

In some embodiments, the configuration management module 198 may determine which component 130, 134 of the automobile 123 is affected by the new requirement. The configuration management module 198 may analyze the sensor data 299 to determine the performance or environment of the component 130, 134 of the automobile 123 that is affected by the new requirement. The configuration management module 198 may determine, based on one or more of the sensor data 299 and the automobile requirement data 205, that the new requirement is not met by the current performance or environment of the affected component 130, 134. The configuration management module 198 may analyze the modification data 140 to identify a new configuration or modifications for the one or more of the characteristic properties 291, 295 or one or more of the configurable parameters 293, 297 that, if implemented, would enable the affected component 130, 134 to operate in conformance with the new requirement. The configuration management module 198 may access one or more tables or data structures of the affected component 130, 134.

In some embodiments, the configuration management module 198 may modify the data or settings stored in the one or more tables or data structures of the affected component 130, 134 so that the identified new configuration or modification for the affected component 130, 134 is implemented.

In some embodiments, the configuration management module 198 may wait a period of time and then recheck the sensor data 299 to ensure that the implemented modification or new configuration caused the affected component 130, 134 to operate in compliance with the new requirement.

Figure 3:
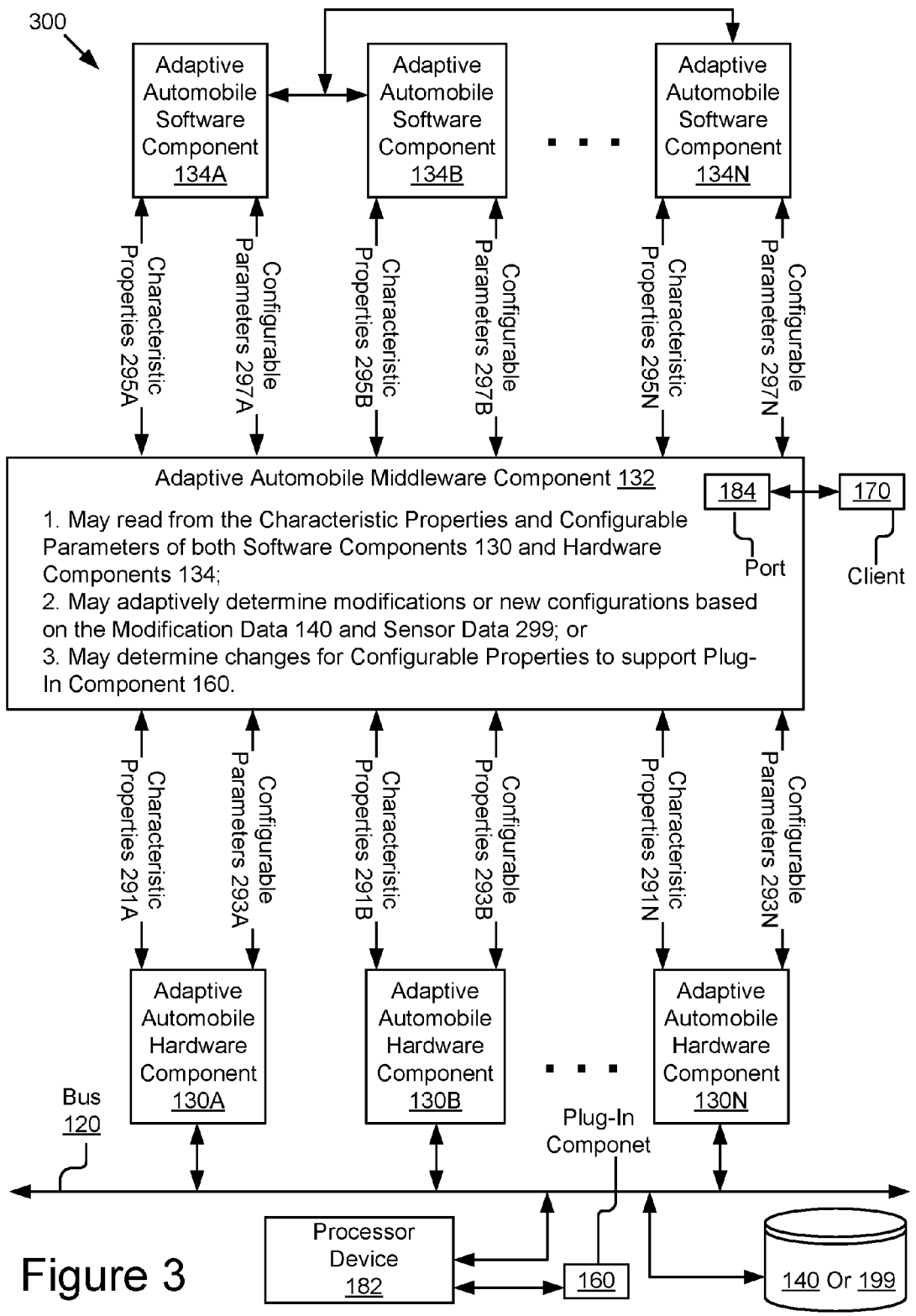
FIG. 3 is a block diagram illustrating an example embodiment of an adaptive automobile middleware component.

Referring now to FIG. 3, depicted is a block diagram illustrating an example embodiment 300 of a configuration management module 198.

The automobile modification system 199 may include a plurality of adaptive automobile software components 134A, 134B . . . 134N (herein "adaptive automobile software components 134"). The adaptive automobile software components 134 may include an associated plurality of characteristic properties 295A, 295B . . . 295N (herein "characteristic properties 295"). The adaptive automobile middleware component 132 may read in the characteristic properties 295 associated with the adaptive automobile software components 134. The adaptive automobile software components 134 may include an associated plurality of configurable parameters 297A, 297B . . . 297N (herein "configurable parameters 297"). The adaptive automobile middleware component 132 may read in the configurable parameters 297 associated with the adaptive automobile software components 134. The adaptive automobile middleware component 132 may adaptively determine changes for one or more of the characteristic properties 295 or configurable parameters 297 based on one or more of the modification data 140 and the sensor data 299.

The automobile modification system 199 may include a plurality of adaptive automobile hardware components 130A, 130B . . . 130N (herein "adaptive automobile hardware components 130"). The adaptive automobile hardware components 130 may include an associated plurality of characteristic properties 291A, 291B . . . 291N (herein "characteristic properties 291"). The adaptive automobile middleware component 132 may read in the characteristic properties 291 associated with the adaptive automobile hardware components 130. The adaptive automobile hardware components 130 may include an associated plurality of configurable parameters 293A, 293B . . . 293N (herein "configurable parameters 293"). The adaptive automobile middleware component 132 may read in the configurable parameters 293 associated with the adaptive automobile hardware components 130. The adaptive automobile middleware component 132 may adaptively determine changes for one or more of the characteristic properties 291 or configurable parameters 293 based on one or more of the modification data 140 and the sensor data 299.

Referring now to FIG. 4A, a block diagram is depicted illustrating an example embodiment of an automobile modification system 199 receiving an input 431 and determining an output 433 responsive to the input 431. The adaptive automobile software component 134 is shown in more detail in FIG. 4A according to some embodiments.

The input 431 may include one or more of the following: modification data 140; automobile requirement data 205; sensor data 299; data received from the configuration management module 198; data describing one or more characteristic properties 291 associated with one or more adaptive automobile hardware components 130; data describing one or more configurable parameters 293 associated with one or more adaptive automobile hardware components 130; data describing one or more characteristic properties 295 associated with one or more adaptive automobile software components 134; data describing one or more configurable parameters 297 associated with one or more adaptive automobile software components 134; data describing a plug-in component 160 being communicatively coupled to an element of the automobile 123; data describing how a plug-in component 160 being communicatively coupled to an element of the automobile affects the performance or environment of an element of the automobile 123.

The output 433 describes a modification or configuration for one or more of the characteristic properties 291, 295 or the configurable parameters 293, 297 based in part on the input 431.

In some embodiments, the automobile modification system 199 may include one or more of the following: the adaptive automobile hardware component 130; the adaptive automobile middleware component 132; the adaptive automobile software component 134; example application independent services 441; application dependent services 443; and a processor 466. These elements of the automobile modification system 199 may be communicatively coupled to one another by a bus 420.

The following elements of the automobile modification system 199 were described above with reference to FIG. 1, 2A, 2B or 3, and so, their descriptions will not be repeated here: the adaptive automobile hardware component 130; the adaptive automobile middleware component 132; and the adaptive automobile software component 134.

The processor 466 includes an arithmetic logic unit, a microprocessor, a general-purpose controller, or some other processor array to perform computations. In some implementations, the processor 466 may provide electronic display signals to a display device. The processor 466 is coupled to the bus 420 for communication with the other of the automobile modification system 199. The processor 466 processes data signals and may include various computing architectures including a complex instruction set computer (CISC) architecture, a reduced instruction set computer (RISC) architecture, or an architecture implementing a combination of instruction sets. The processor 466 may include a graphical processing unit. Although FIG. 4A includes a single processor 466, multiple processors 466 may be included. Other processors, operating systems, sensors, displays, and physical configurations may be possible.

In some embodiments, the adaptive automobile software component 134 may include one or more of the following elements: a fault tolerance add-on 497 associated with the adaptive automobile software component 134; a security add-on 499 associated with the adaptive automobile software component 134; characteristic properties 291; configurable parameters 293; characteristic properties 295; and configurable parameters 297.

The following elements of the adaptive automobile software component 134 were described above with reference to FIG. 1, 2A, 2B or 3, and so, their descriptions will not be repeated here: characteristic properties 291; configurable parameters 293; characteristic properties 295; and configurable parameters 297.

In some embodiments, the fault tolerance add-on 497 associated with the adaptive automobile software component 134 may include one or more of the following elements: a flow checking module 407; a signature checking module 409; and other fault tolerance modules 411.

The flow checking module 407 may include code and routines configured to provide control flow checking for the adaptive automobile software component 134. The flow checking module 407 may generate control flow data describing the control flow associated with the adaptive automobile software component 134. One or more of the adaptive automobile middleware component 132 and the configuration management module 198 may use the control flow data to provide their functionality. For example, the control flow data may be a type of sensor data 299.

For adaptive automobile software components 134 whose operation includes application-dependent services, the control flow data may describe control flow violations in which control flow is not behaving as expected or defined by the requirements for the control flow. The fault tolerance add-on 497 may then provide the control flow data to one or more of the adaptive automobile middleware component 132 or the configuration management module 198. The adaptive automobile middleware component 132 or the configuration management module 198 may then determine an output 433 based in part on the control flow data.

The signature checking module 409 may include code configured to check signatures for instructions that are executed by the adaptive automobile software component 134. The automobile modification system 199 may include a memory storing one or more valid signatures. If the signature checking module 409 identifies an invalid signature, the signature checking module 409 may generate a type of sensor data 299 referred to as "signature error data." The signature error data may describe the instance of the invalid signature. The signature checking module 409 may transmit the signature error data to one or more of the adaptive automobile middleware component 132 or the configuration management module 198.

The other fault tolerance modules 411 may include code and routines configured to provide other fault tolerance services to the adaptive automobile software component 134. For example, the other fault tolerance modules 411 may include a watch dog service that monitors for specific failures associated with the adaptive automobile software components 134 or the adaptive automobile hardware components 130 that may cause the automobile modification system 199 or one or more other elements of the automobile 123 to stop responding. The watch dog service may generate a type of sensor data 299 referred to as "watch dog data." The watch dog data may describe instances of the specific failures that are being monitored by the watch dog service as defined by the adaptive automobile middleware component 132 or the configuration management module 198. The watch dog service may transmit the watch dog data to one or more of the adaptive automobile middleware component 132 or the configuration management module 198.

For adaptive automobile software components 134 whose operation includes application-independent services, the watch dog data may describe instances of specific failures that are being monitored by the watch dog service. The watch dog data may be transmitted to one or more of the adaptive automobile middleware component 132 or the configuration management module 198. The adaptive automobile middleware component 132 or the configuration management module 198 may then determine an output 433 based in part on the watch dog data.

In some embodiments, the security add-on 499 associated with the adaptive automobile software component 134 may include one or more of the following elements: an encryption module 413; an authentication module 415; and other security modules 417.

The encryption module 413 may include code and routines configured to encryption the operations of the adaptive automobile software components 134 or access to the adaptive automobile software components 134. The encryption module 413 may provide an encryption service for other elements of the automobile 123.

The encryption module 413 may detect instances of an entity attempting to break or bypass the encryption. These instances may be recorded by a type of sensor data 299 referred to as "encryption data." The encryption data may describe the instances where an entity attempted to break or bypass the encryption. The encryption module 413 may transmit the encryption data to one or more of the adaptive automobile middleware component 132 or the configuration management module 198.

In some embodiments, the encryption module 413 may provide encryption by executing a standard encryption algorithm provided by the security service 439. However, detection of a security event may require the built-in code and a prior at the same time, which may not be completed by calling the security service 439 to use a standard encryption algorithm. Accordingly, in some embodiments the encryption module 413 may call the security service 439 for adaptive automobile software components 134 whose operation includes one or more application-independent services, whereas built-in encryption extensions may be utilized by the encryption module 413 for adaptive automobile software components 134 whose operation includes one or more application-dependent services.

The authentication module 415 may include code and routines configured to provide an authentication service for the adaptive automobile software components 134 or other elements of the automobile 123.

The authentication module 415 may detect instances of an entity attempting to break or bypass the authentication. These instances may be recorded by a type of sensor data 299 referred to as "authentication error data." These instances may include attempts to use brute force to guess a password. The authentication error data may describe the instances where an entity attempted to break or bypass the authentication. The authentication module 415 may transmit the authentication error data to one or more of the adaptive automobile middleware component 132 or the configuration management module 198.

The other security modules 417 may include code and routines configured to provide other security services for the adaptive automobile software components 134 or other elements of the automobile 123. For example, the other security modules 417 may check sensor data 299 to determine if the measurements obey the rules of nature. Instances where the measurements included in the sensor data 299 may be recorded by a type of sensor data 299 referred to as "sensor error data." The sensor error data may describe the instances where a measurements included in sensor data 299 does not appear to obey the rules of nature. The other security modules 417 may transmit the sensor error data to one or more of the adaptive automobile middleware component 132 or the configuration management module 198.

The example application independent services 441 include one or more of the following: the fault tolerance service 437 and the security service 439.

The fault tolerance service 437 may include code and routines configured to assist the fault tolerance add-on 497 associated with the adaptive automobile software component 134 in identifying faults or errors associated with execution of software or operation of hardware included in the automobile 123 (i.e., a "fault event") and providing sensor data 299 describing the fault events (and optional recommend outputs 433 configured to remedy the fault events) to one or more of the adaptive automobile middleware component 132 or the configuration management module 198.

In some embodiments, the configuration management module 198 may provide its functionality at runtime (e.g., while the automobile 123 is operational and during a journey) while the modification data 140 itself was determined at a design time (e.g., at the factory, or via nightly wireless updates to the automobile 123 via the network 105).

The security service 439 may include code and routines configured to assist the security add-on 499 associated with the adaptive automobile software component 134 in identifying security events and providing sensor data 299 describing the security events (and optional recommend outputs 433 configured to remedy the security events) to one or more of the adaptive automobile middleware component 132 or the configuration management module 198.

In some embodiments, a security event may include any event that violates a security rule of the automobile modification system 199. The security rules may be described, at least in part, by the configurable parameters 293, 297. The security rules may be stored as security data included in a memory accessible by the security service 439.

In some embodiments, a security event may include any event in which operation of hardware or execution of software included in the automobile 123 results in a violation of a security rule or a pattern of activity or behavior that may be determined by the security service 439 to be a security event.

In some embodiments, upon detection of a security event the automobile modification system 199 may provide an output 433 that includes a warning to the user of the automobile 123 describing the threat and a recommended action (e.g., stop driving the automobile 123). Optionally, the output 433 may include the automobile modification system 199 causing the automobile 123 to automatically drive to the safest location and stop the automobile 123 from further operation until the security event is remedied. The automobile modification system 199 may provide a graphical user interface, audio, or some other feedback to the user to inform them of the security event and the output 433.

The application dependent services 443 include code and routines configured to provide one or more services to the automobile modification system 199 that specific to a particular adaptive automobile hardware component 130 or adaptive automobile software component 134.

Figure 4B:
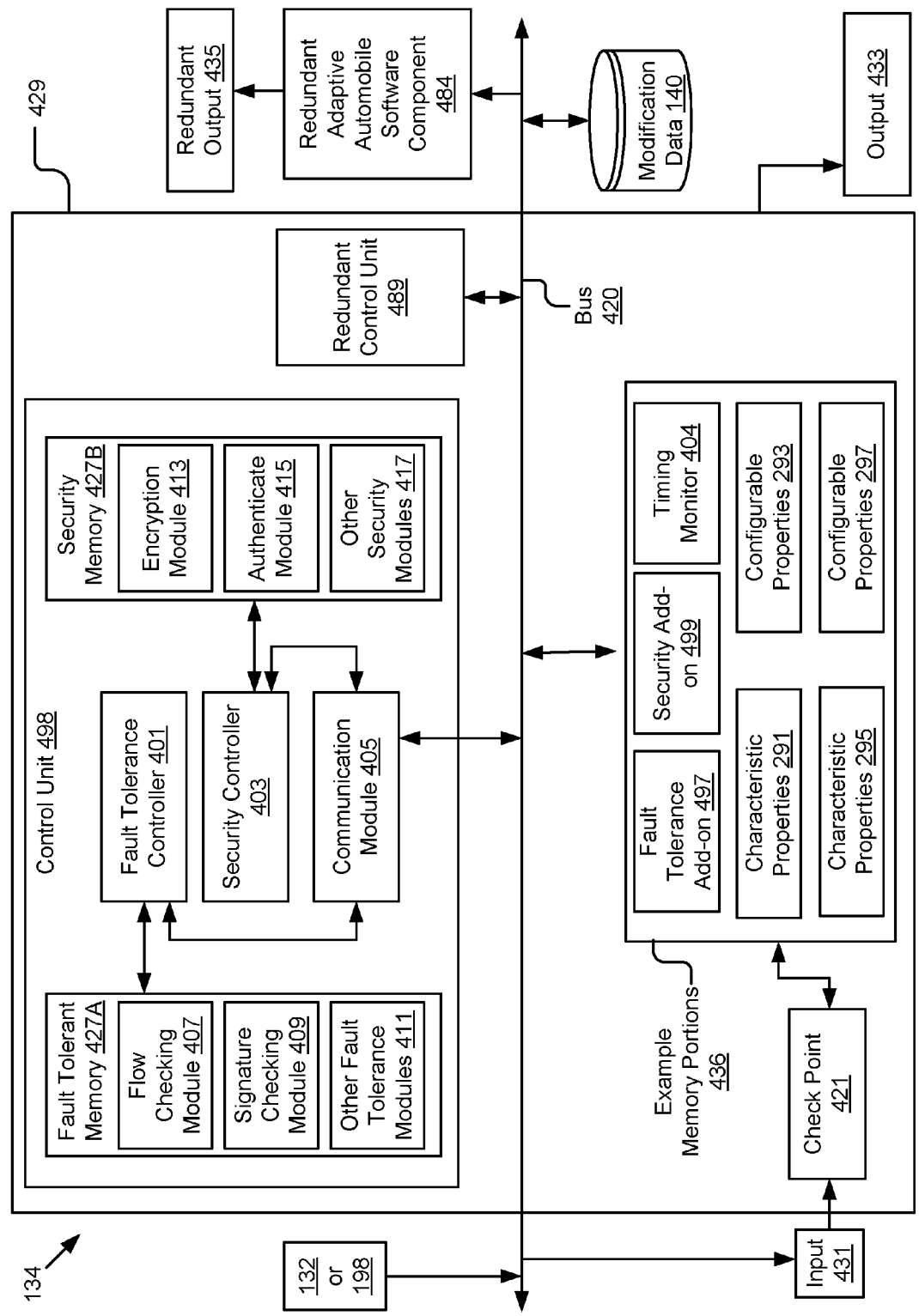
FIG. 4B is block diagram illustrating an example embodiment of an adaptive automobile software component receiving an input and determining an output responsive to the input.
Figure 4C:
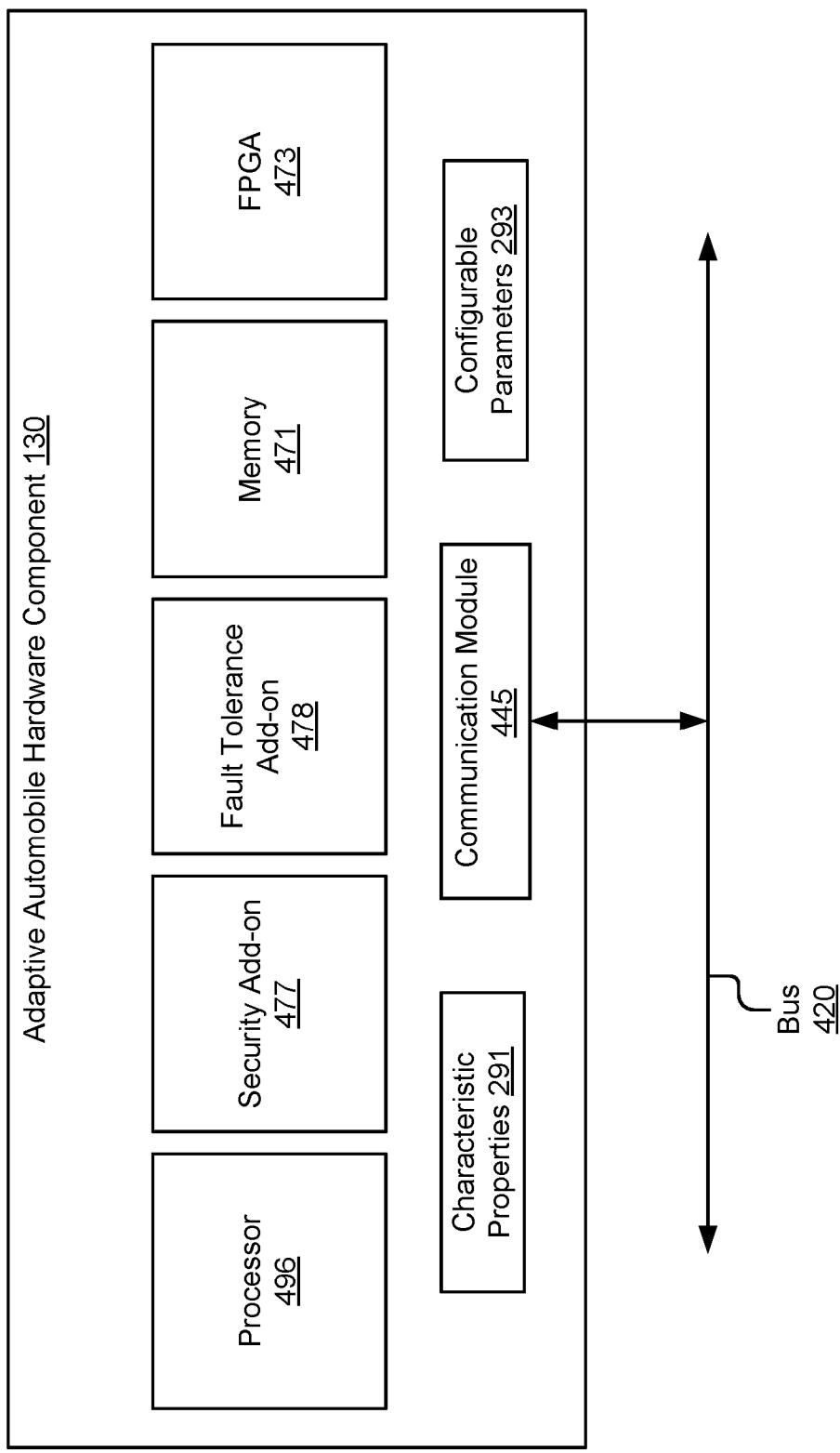
FIG. 4C is a block diagram illustrating an example embodiment of an adaptive automobile hardware component.

Referring now to FIG. 4B, a block diagram is depicted illustrating an example embodiment of the adaptive automobile software component 134 receiving an input 431 and determining an output 433 responsive to the input 431. These elements may be communicatively coupled to one another via the bus 420. The adaptive automobile software component 134 is shown in more detail in FIG. 4B according to some embodiments.

The depicted embodiment may include one or more of the following elements: the adaptive automobile middleware component 132; the configuration management module 198; the input 431; the output 433; a redundant output 435; a memory 429; modification data 140; and a redundant adaptive automobile software component 484.

The following elements of the embodiment depicted in FIG. 4B were described above with reference to FIG. 1, 2A, 2B, 3, or 4A and so, their descriptions will not be repeated here: the configuration management module 198; the input 431; the output 433; and the modification data 140.

The memory 429 may be a non-transitory computer-readable storage medium. The memory 429 stores instructions or data that may be executed by a processor (e.g., elements 225 or 466). The instructions or data may include code for performing the techniques described herein. The memory 429 may be a dynamic random access memory (DRAM) device, a static random access memory (SRAM) device, flash memory, or some other memory device. In some implementations, the memory 429 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 429 may store some or all of the data needed by the adaptable automobile software component 134 to provide its functionality.

In some embodiments, one or more of the following elements may be a subcomponent of the memory 429: a fault tolerant memory 427A; a security memory 427B; a check point 421; and example memory portions 436.

In some embodiments, the adaptive automobile software component 134 may include one or more of the following elements: a control unit 498; a redundant control unit 489; a check point module 421; and one or more example memory portions 436.

In some embodiments, each adaptive automobile software component 134 may include a check point 421. The check point 421 may include a portion of a memory 429 that stores a type of sensor data 299 referred to as "state data." The state data may describe the state of one or more elements of the automobile 123 prior to execution of the adaptive automobile software component 134. For example, the state data describes the state of a processor-based device or sensor prior to execution of the adaptive automobile software component 134. The check point 421 may also store the input 431 prior to processing by the control unit 498, the redundant control unit 489 or the redundant adaptive automobile software component 484.

The check point module 421 may transmit the state data to one or more of the adaptive automobile middleware component 132, the configuration management module 198, the control unit 498, the redundant control unit 489 or the redundant adaptive automobile software component 484. One or more of these elements may detect an error (e.g., a fault event or a security event) and cause the adaptive automobile software component 134 to roll back to a prior state described by the state data. The processor 466 described above with reference to FIG. 4A may then re-execute the adaptive automobile software component 134 to check and see if the error reoccurs.

In some embodiments, the example memory portions 436 may include a portion of the memory 429 that stores one or more of the following elements: a fault tolerance add-on 497 associated with the adaptive automobile software component 134; a security add-on 499 associated with the adaptive automobile software component 134; a timing monitor 404; one or more characteristic properties 291 associated with the adaptive automobile hardware component 130; one or more characteristic properties 295 associated the adaptive automobile software component 134; one or more configurable parameters 293 associated with the adaptable automobile hardware component 130; and one or more configurable parameters 297 associated with the adaptive automobile software component 134.

For the purpose of clarity, it is noted that the adaptive automobile software component may include a fault tolerance add-on 497 and a security add-on 499 that are both associated with the adaptive automobile software component 134, whereas the adaptive automobile hardware component 130 may include a different security add-on 477 and fault tolerance add-on 478 that are both associated with the adaptive automobile hardware component 130. The security add-on 477 associated with the adaptive automobile hardware component 130 and fault tolerance add-on 478 associated with the adaptive automobile hardware component 130 are described in more detail below with reference to FIG. 4C.

The following example memory portions 436 were described above with reference to FIG. 1, 2A, 2B, 3 or 4A, and so, their descriptions will not be repeated here: a fault tolerance add-on 497 associated with the adaptive automobile software component 134; a security add-on 499 associated with the adaptive automobile software component 134; one or more characteristic properties 291 associated with the adaptive automobile hardware component 130; one or more characteristic properties 295 associated the adaptive automobile software component 134; one or more configurable parameters 293 associated with the adaptable automobile hardware component 130; and one or more configurable parameters 297 associated with the adaptive automobile software component 134.

The timing monitor 404 may include code and routines that causes a processor (e.g., elements 225 and 466) to execute one or more of the following steps responsive to being executed by the processor: access state data stored in the check point 421; monitor for errors; rolling back the adaptive automobile software component 134 to an earlier state described by the most recent version of the state data if an error is identified; and re-executing the adaptive automobile software component 134 to determine if the error will reoccur.

In some embodiments, the control unit 498 may include one or more of the following elements: a fault tolerant memory 427A; a security memory 427B; a fault tolerance controller 401; a security controller 403; and a communication module 405.

The communication module 405 may be software including routines for handling communications between the control unit 498 and other components of the automobile modification system 199. In some embodiments, the communication module 405 may handle communications between the automobile modification system 199 and other elements of the operating environment 100 described above with reference to FIG. 1.

In some embodiments, the communication module 405 may be a set of instructions executable by a processor (e.g., processor 225 or 466) to provide the functionality described below for handling communications between elements of the operating environment 100 described above with reference to FIG. 1. In some implementations, the communication module 405 can be stored in the memory (e.g., memory 227B described above with reference to FIG. 2A) and may be accessible and executable by the processor. The communication module 405 may be adapted for cooperation and communication with the processor and other components via a communicative coupling to the bus 420.

The communication module 405 sends and receives data, via a communication unit (e.g., element 245 described above with reference to FIG. 2A), to and from one or more elements of the operating environment 100.

In some embodiments, the communication module 405 receives data (e.g., input 431) from one or more components of the operating environment 100 and stores the data in one or more of the memories 227A, 227B, 427A, 427B. The communication module 405 may also retrieve data from one or more components of the operating environment 100.

The fault tolerance controller 401 may include code and routines configured to manage the operation of the modules of the fault tolerant memory 427A. The fault tolerance controller 401 itself may be managed by the fault tolerance add-on 497 or an element of the fault tolerance add-on 497.

In some embodiments, the fault tolerance controller 401 may be a processor-based computing device communicatively coupled to the bus 420. In these embodiments, the fault tolerance controller 401 may include a memory that stores the fault tolerance add-on 497 and operates based on instructions received from execution of the fault tolerance add-on 497 by its associated processor.

The fault tolerance controller 401 may control the operation of one or more fault tolerance services, including control flow checking, instruction signature checking and a watch dog service.

The security controller 403 may include code and routines configured to manage the operation of the modules of the security memory 427B. The security controller 403 itself may be managed by the security add-on 499 or an element of the security add-on 499.

In some embodiments, the security controller 403 may be a processor-based computing device communicatively coupled to the bus 420. In these embodiments, the security controller 403 may include a memory that stores the security add-on 499 and operates based on instructions received from execution of the security add-on 499 by its associated processor.

The security controller 403 may control the operation of one or more security services, including an encryption and an authentication service.

The memories 427A, 427B may be referred to herein individually or collectively as memory 427.

The fault tolerant memory 427A (e.g., memory 427 or memory 427A) may be a non-transitory computer-readable storage medium. The memory 427A stores instructions or data that may be executed by a processor (e.g., elements 225 or 466). The instructions or data may include code for performing the techniques described herein. The memory 427A may be a dynamic random access memory (DRAM) device, a static random access memory (SRAM) device, flash memory, or some other memory device. In some implementations, the memory 427A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 427A may store some or all of the data needed by one or more of the fault tolerance controller 401, fault tolerance add-on 497 associated with the adaptive automobile software component 134, the configuration management module 198 and the automobile modification system 199.

In some embodiments, the memory 427A may include one or more of the following elements: the flow checking module 407; the signature checking module 409; and the other fault tolerance modules 411. These elements of the memory 427A were described above with reference to FIG. 4A, and so, these descriptions will not be repeated here.

The security memory 427B may be a non-transitory computer-readable storage medium. The memory 427B stores instructions or data that may be executed by a processor (e.g., elements 225 or 466). The instructions or data may include code for performing the techniques described herein. The memory 427B may be a dynamic random access memory (DRAM) device, a static random access memory (SRAM) device, flash memory, or some other memory device. In some implementations, memory 427B also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 427B may store some or all of the data needed by one or more of the security controller 403, security add-on 499, the configuration management module 198 and the automobile modification system 199.

In some embodiments, the memory 427B may include one or more of the following elements: the encryption module 413; the authentication module 415; and the other security modules 417. These elements of the memory 427B were described above with reference to FIG. 4A, and so, these descriptions will not be repeated here.

The redundant control unit 489 may include the same or similar elements as the control unit 498. These elements may operate in a manner that is the same or similar to the control unit 498. The redundant control unit 489 may beneficially provide error detection for the adaptive automobile software component 134. For example, the control unit 498 may provide an output 433 based at least in part on the input 431. The redundant control unit 489 may process the input 431 and provide a redundant output 435 based at least in part on the input 431. The control unit 498 may analyze the output 433 provided by the control unit 498 and compare it to the redundant output 435 provided by the redundant control unit 489. If the output 433 does not match the redundant output 435, the control unit 498 may include code and routines configured to determine the presence of a soft error and then start a recovery process.

In some embodiments, the recovery process may include providing restarting one or more elements of the automobile 123 that are associated or likely associated with the soft error, a warning to the user of the automobile 123 about the presence of the soft error, providing a suggested remedy to the user of the automobile 123 to correct the soft error, or causing the automobile 123 to stop operation in a manner that is safe for the user of the automobile 123 given the current circumstances of the automobile 123. The recovery process may further include connecting the automobile 123 to a client 170 so that the automobile 123 may be serviced to correct a fault event or security event detected by the control unit 498.

In some embodiments, the recovery process may include any step or combination of steps that are configured to resolve the fault event or security event, or otherwise ensure the safety of the user of the automobile 123.

The redundant adaptive automobile software component 484 may include the same or similar elements as the adaptive automobile software component 134. These elements may operate in a manner that is the same or similar to the adaptive automobile software component 134. The redundant adaptive automobile software component 484 may beneficially provide error detection for the adaptive automobile software component 134. For example, the adaptive automobile software component 134 may provide an output 433 based at least in part on the input 431. The redundant adaptive automobile software component 484 may process the input 431 and provide a redundant output 435 based at least in part on the input 431. The control unit 498 may analyze the output 433 provided by the adaptive automobile software component 134 and compare it to the redundant output 435 provided by the redundant adaptive automobile software component 484. If the output 433 does not match the redundant output 435, the control unit 498 may include code and routines configured to start a recovery process.

One or more of the adaptive automobile middleware component 132 or the configuration management module 198 may provide an input 431 to the adaptive automobile software component 134. The adaptive automobile software component 134 may determine an output 433 based in part on the input 431. The input 431 may include instructions, commands, calls or other data from one or more of the adaptive automobile middleware component 132 or the configuration management module 198. The input 431 may by processed by the by the adaptive automobile software component 134 as described herein to determine an output 433.

Referring now to FIG. 4C, depicted is a block diagram illustrating an example embodiment of an adaptive automobile hardware component 130.

In some embodiments, the adaptive automobile hardware component 130 may include one or more of the following elements: a processor 496; a security add-on 477 associated with the adaptive automobile hardware component 130; a fault tolerance add-on 478 associated with the adaptive automobile hardware component 130; a memory 471; an FPGA 473; a communication module 445; one or more characteristic properties 291 associated with the adaptive automobile hardware component 130; and one or more configurable parameters 293 associated with the adaptive automobile hardware component 130.

The one or more characteristic properties 291 associated with the adaptive automobile hardware component 130 and the one or more configurable parameters 293 associated with the adaptive automobile hardware component 130 were described above with reference to FIG. 2A, 2B, 3, 4A or 4B, and so, these descriptions will not be repeated here.

The one or more characteristic properties 291 associated with the adaptive automobile hardware component 130 and the one or more configurable parameters 293 associated with the adaptive automobile hardware component 130 may be read and reconfigured by one or more of the adaptive automobile middleware component 132 or the configuration management module 198 so that the adaptive automobile hardware component 130 operates in compliance with one or more requirements for the automobile 123 as described by the automobile requirement data 205.

The processor 496 may execute one or more of the adaptive automobile software components 134. The processor 496 includes an arithmetic logic unit, a microprocessor, a general-purpose controller, or some other processor array to perform computations. In some implementations, the processor 496 may provide electronic display signals to a display device. The processor 496 is coupled to the bus 420 for communication with the other of the automobile modification system 199. The processor 496 processes data signals and may include various computing architectures including a complex instruction set computer (CISC) architecture, a reduced instruction set computer (RISC) architecture, or an architecture implementing a combination of instruction sets. The processor 496 may include a graphical processing unit. Although FIG. 4C includes a single processor 496, multiple processors 496 may be included. Other processors, operating systems, sensors, displays, and physical configurations may be possible.

The memory 471 may be a non-transitory computer-readable storage medium. The memory 471 stores instructions or data that may be executed by the processor 496. The instructions or data may include code for performing the techniques described herein. The memory 471 may be a dynamic random access memory (DRAM) device, a static random access memory (SRAM) device, flash memory, or some other memory device. In some implementations, the memory 471 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 471 may store some or all of the data needed by the adaptive automobile hardware component 130, the configuration management module 198 or the automobile modification system 199 to perform their functions.

In some embodiments, one or more of the following elements may be stored on the memory 471: one or more characteristic properties 291 associated with the adaptive automobile hardware component 130; the one or more configurable parameters 293 associated with the adaptive automobile hardware component 130; any software aspects of the security add-on 477; and any software aspects of the fault tolerance add-on 478; the communication module 445.

The communication module 445 may be software including routines for handling communications between the adaptive automobile hardware component 130 and other components of the automobile modification system 199. In some embodiments, the communication module 445 may handle communications between the adaptive automobile hardware component 130 and other elements of the operating environment 100 described above with reference to FIG. 1.

In some embodiments, the communication module 445 may be a set of instructions executable by a processor 496 to provide the functionality described below for handling communications between elements of the operating environment 100 described above with reference to FIG. 1. In some implementations, the communication module 445 can be stored in the memory 471 and may be accessible and executable by the processor 496. The communication module 445 may be adapted for cooperation and communication with the processor 496 and other components via a communicative coupling to the bus 420.

The communication module 445 sends and receives data, via a communication unit (e.g., element 245 described above with reference to FIG. 2A), to and from one or more elements of the operating environment 100.

In some embodiments, the communication module 445 transmits the one or more characteristic properties 291 associated with the adaptive automobile hardware component 130 and the one or more configurable parameters 293 associated with the adaptive automobile hardware component 130 to the other elements of the automobile modification system 199. The communication module 445 may also retrieve data from one or more components of the operating environment 100.

The security add-on 477 may include hardware, software or a combination of hardware and software. The security add-on 477 may be configured to communicate with one or more of the adaptive automobile middleware component 132 or the configuration management module 198. The security add-on 477 may be configured to receive instructions from one or more of the adaptive automobile middleware component 132 or the configuration management module 198. The security add-on 477 may be configured to execution instructions received from one or more of the adaptive automobile middleware component 132 or the configuration management module 198. The instructions may relate to identification of security events or recovery processes for any error.

The security add-on 477 may be a special purpose processor-based hardware component configured to enhance the security of the adaptive hardware component 130 against a specific security risk. The security add-on 477 may by identify security events or respond to security events. For example, the security add-on 477 may include processor-based hardware configured to identify and thwart a side channel attack on any element of the automobile modification system 199, including the adaptive automobile hardware component 130.

The fault tolerance add-on 478 may include hardware, software or a combination of hardware and software. The fault tolerance add-on 478 may by identify fault tolerance events or respond to fault tolerance events. The fault tolerance add-on 478 may be configured to communicate with one or more of the adaptive automobile middleware component 132 or the configuration management module 198. The fault tolerance add-on 478 may be configured to receive instructions from one or more of the adaptive automobile middleware component 132 or the configuration management module 198. The fault tolerance add-on 478 may be configured to execution instructions received from one or more of the adaptive automobile middleware component 132 or the configuration management module 198. The instructions may relate to identification of fault events or recovery processes for any error.

The fault tolerance add-on 478 may be a special purpose processor-based hardware component configured to enhance the fault tolerance of the adaptive hardware component 130 against a specific fault risk. For example, the fault tolerance add-on 478 may include processor-based hardware configured to provide a watch dog timer service.

In some embodiments, the watch dog timer service may be include enhancing the fault tolerance for execution of operations that include application dependent or application independent services.

The FPGA 473 may include hardware that is configured to provide accelerated performance of one or more of the components of the adaptive automobile hardware component 130. For example, one or more elements of the adaptive automobile hardware component 130 may be configured as an FPGA 473 and implemented as hardware.

Figure 4D:
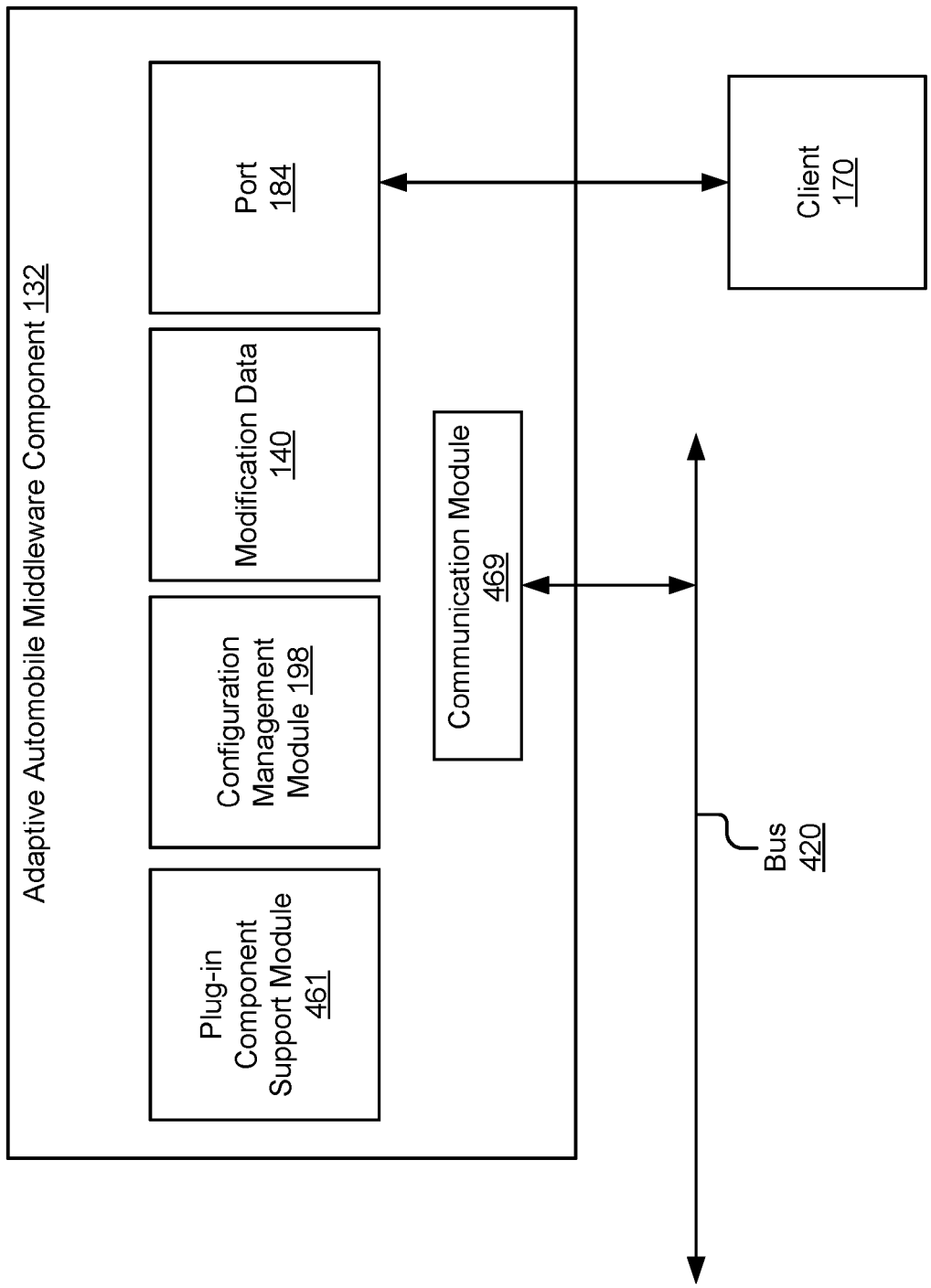
FIG. 4D is a block diagram illustrating an example embodiment of an adaptive automobile middleware component.

Referring to FIG. 4D, depicted is a block diagram illustrating an example embodiment of an adaptive automobile middleware component 132.

In some embodiments, the adaptive automobile middleware component 132 may include one or more of the following elements: a plug-in component support module 461; the configuration management module 198; modification data 140; the port 184 and a communication module 469. The port 184 may be communicatively coupled to the client 170. The adaptive automobile middleware component 132 may be communicatively coupled to the other components of the automobile modification system 199 via the bus 420 which is communicatively coupled to the communication module 469.

The adaptive automobile middleware component 132 may include an instantiated combination of software and hardware components that provide the automobile modification system 199 with fault tolerance and security support. The elements of the adaptive automobile middleware component 132 may be statically configured and implemented at design time, whereas the other elements of the automobile modification system 199 (e.g., adaptive automobile hardware component 130 and adaptive automobile software component 134) may be dynamically and adaptively configured by the configuration management module 198 of the adaptive automobile middleware component 132 at runtime based on inputs such as one or more of the automobile requirement data 205 or the sensor data 299.

The following elements of the adaptive automobile middleware component 132 were described above with reference to FIG. 1, 2A, 2B, 3, 4A, 4B or 4C, and so, there descriptions will not be repeated here: the configuration management module 198; the modification data 140; and the port 184.

The plug-in component support module 461 includes code and routines configured to provide support for the plug-in component 160 by performing or causing to be performed, by a processor of one or more of the automobile 123 or the client 170, one or more of the following steps: (1) determine how the plug-in component 160 changes the operation or performance of the processing device 182, the adaptive automobile hardware component 130, the adaptive automobile software component (or some other hardware or software of the automobile 123); and (2) disabling the automobile 123 until the automobile 123 is connected to the client 170 or some other processor-based computing device including the configuration management module 198.

Figure 6:
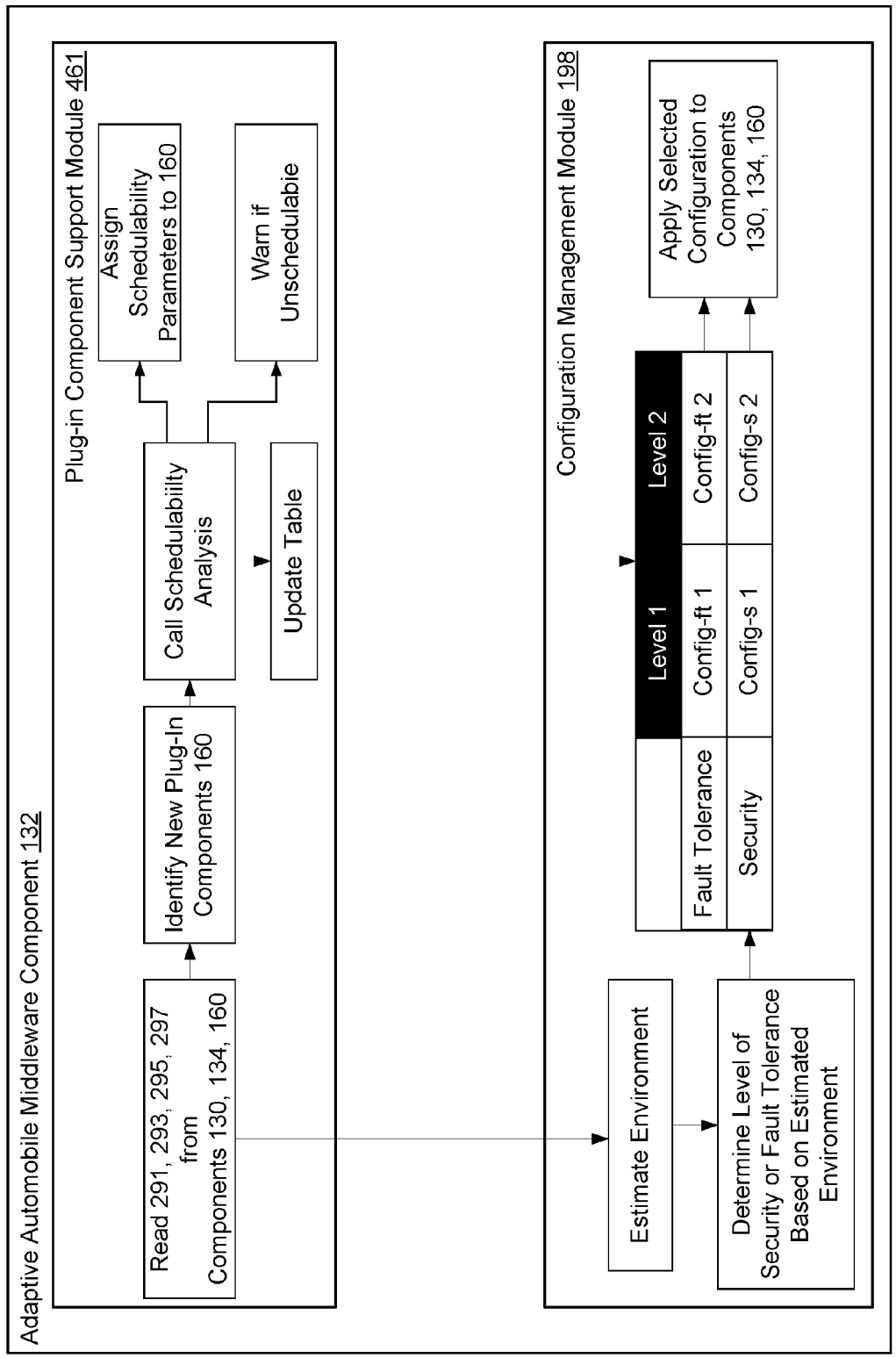
FIG. 6 is a block diagram illustrating an example embodiment of an adaptive automobile middleware component.

FIG. 6 includes a block diagram depicting an example of the adaptive automobile middleware component according to some embodiments. FIG. 6 may be referenced with regard to understanding the relationship between the plug-in component support module 461 and the configuration management module 198, according to some embodiments.

Referring back to FIG. 5C, in some embodiments, the plug-in component support module 461 may include a real time scheduling analysis system or access to such a system via the client 170. The real time scheduling analysis system may include a scheduling analysis algorithm. The scheduling analysis algorithm may be specially configured to operate with one or more of the adaptive automobile middleware component 132 or the configuration management module 198.

In some embodiments, the plug-in component support module 461 may complete set-up of the plug-in component 160 by performing one or more of the following steps: (1) determine the schedulability of providing support for the plug-in component 160; (2) assign one or more scheduling parameters for providing support for the plug-in component 160; (3) reconstruct a data structure (e.g., a look-up table) included in the modification data 140 containing one or more configurations for different fault tolerance and security levels for different elements of the automobile modification system 199 so that the plug-in component 160 may be schedulable and operable with the automobile modification system 199; (4) apply the configurations to the different elements of the automobile modification system 199; (5) apply schedulability parameters to the plug-in component 160; and (6) execute the plug-in component 160 to confirm that it is operable without causing a fault or security event. See, for example, FIG. 6.

Referring back to FIG. 5C, In some embodiments, the plug-in component support module 461 may execute one or more of the following steps: (1) read one or more characteristic properties 291, 295 or configurable parameters 293, 297 from the automobile modification system 199; (2) determine based on the one or more characteristic properties 291, 295 or configurable parameters 293, 297 whether a new plug-in component 160 is communicatively coupled to the bus 420; (3) responsive to identifying the presence of a new plug-in component, call a schedulability analysis algorithm; (4) execute the schedulability analysis algorithm to analyze the schedulability of the new plug-in component and thereby determine whether the new plug-in component 160 violates a timing or resource constraint (e.g., as described by the automobile requirement data 205 or some other data stored by the automobile 123 or client 170 that describes timing or resource constraints); (5) if the timing and resource constraints are not violated, determine that the automobile modification system 199 is schedulable with the addition of the new plug-in component and assign one or more scheduling parameters to the new plug-in component 160 so that it is successfully implemented in the automobile modification system 199; (6) if either the timing or resource constraints are violated, determine that the automobile modification system 199 is not schedulable with the addition of the new plug-in component 160, then (a) determine one or more updates for a look-up table included in the modification data 140 containing one or more configurations for different fault tolerance and security levels for the elements of the automobile modification system 199 including the new plug-in component 160, wherein the updates are configured to enable the new plug-in component to operate in the automobile modification system 199 without violating the timing or resource constraints; (b) reconstruct the look-up table included in the modification data 140 based on the updates; (c) assign the new configurations described by the look-up table to each component of the automobile modification system 199; and (d) determine that the automobile modification system 199 is schedulable with the addition of the new plug-in component 160 and the reconstructed look-up table and assign one or more scheduling parameters to the new plug-in component 160 so that it is successfully implemented in the automobile modification system 199.

The resource constraint may include one or more of a security requirement and a fault tolerance requirement. The resource constraint may include the capabilities of a processor (e.g., processor 225) of the automobile 123. For example, the resource constrain may include the maximum computational overhead for the processor 225, the maximum performance level for the processor 225 or the timing for a bus, sensor or any other element of the automobile 123 that includes a timing constraint.

In some embodiments, the configuration management module 198 may provide some or all of the functionality of the plug-in component support module 461. In some embodiments, some or all of the code for the configuration management module 198 may be an element of the client 170 and the client 170 may execute the configuration management module 198 to provide its functionality for enabling support for the plug-in component 160.

The communication module 469 provides functionality similar to the communication module 445 described above with reference to FIG. 4C, and so, that description will not be repeated here.

FIGS. 5A-5D are a block diagram illustrating an example flowchart for a method 500 that may be implemented by the automobile modification system 199.

One or more of the steps of the method 500 may be implemented by one or more of the adaptive automobile middleware component 132 or the configuration management module 198. In some embodiments, some of the steps of the method 500 may be implemented by the adaptive automobile middleware component 132 while other steps of the method 500 may be implemented by the configuration management module 198.

In some embodiments, the client 170 includes a first configuration management module that executes some of the steps of the method 500 while the adaptive automobile middleware component 132 includes a second configuration management module that executes the other steps of the method 500.

In some embodiments, the client 170 may be an element of the automobile modification system 199 by being communicatively coupled to a bus of the automobile modification system 199.

In some embodiments, one or more steps of the method 500 may be omitted. In some embodiments, the steps of the method 500 may be executed in a different order than the one depicted in FIGS. 5A, 5B and 5C.

The method 500 may be described by reference to one or more of the elements described above with reference to FIG. 1, 2A, 2B, 3, 4A, 4B, 4C or 4D.

Figure 5A:
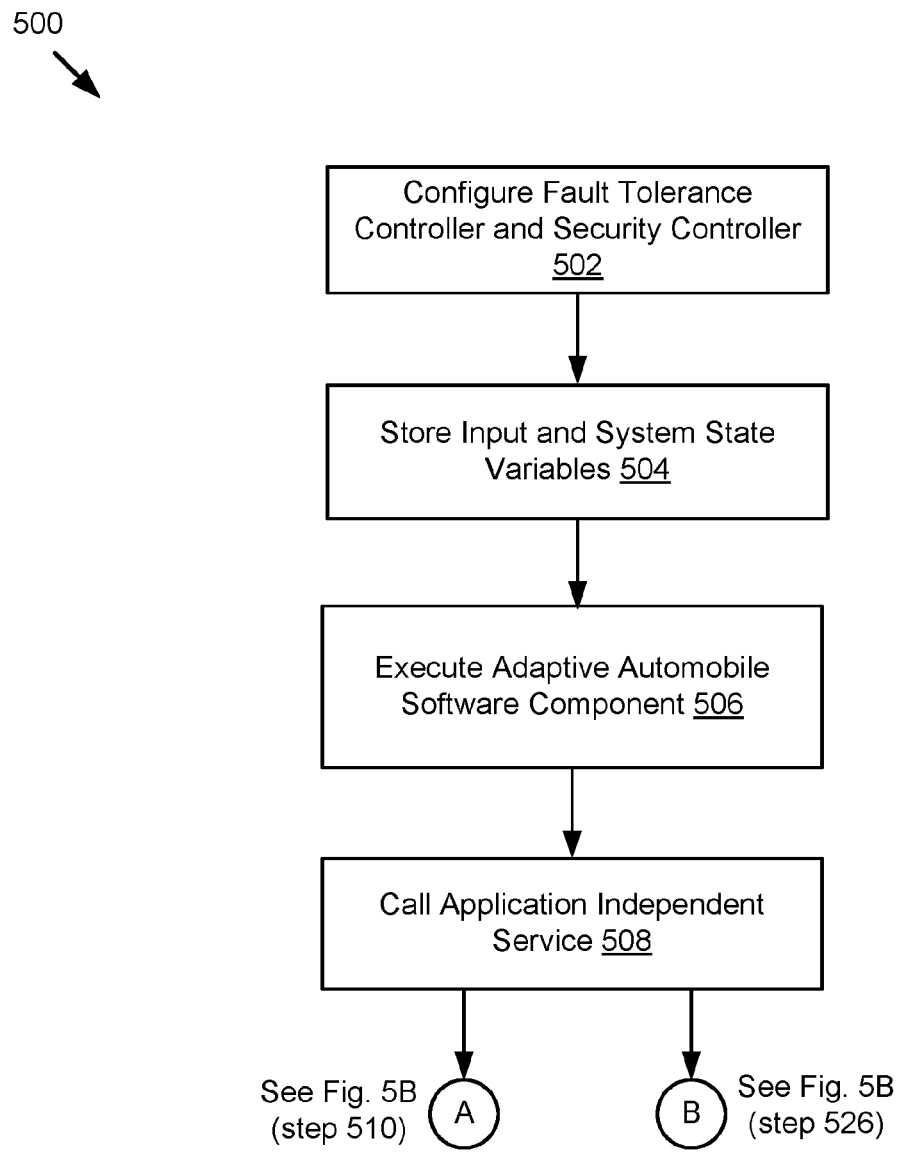
FIGS. 5A-5C are a block diagram illustrating an example flowchart for a method that may be implemented by the automobile modification system.

Referring to FIG. 5A, the method 500 may include configuring 502 a fault tolerance controller and a security controller.

The method 500 may include storing 504 an input and one or more system state variables. The system state variables may be described by state data.

The method 500 may include executing 506 an adaptive automobile software component.

The method 500 may include calling 508 an application independent service. The application independent services may include one or more of a fault tolerance service or a security service.

Figure 5B:
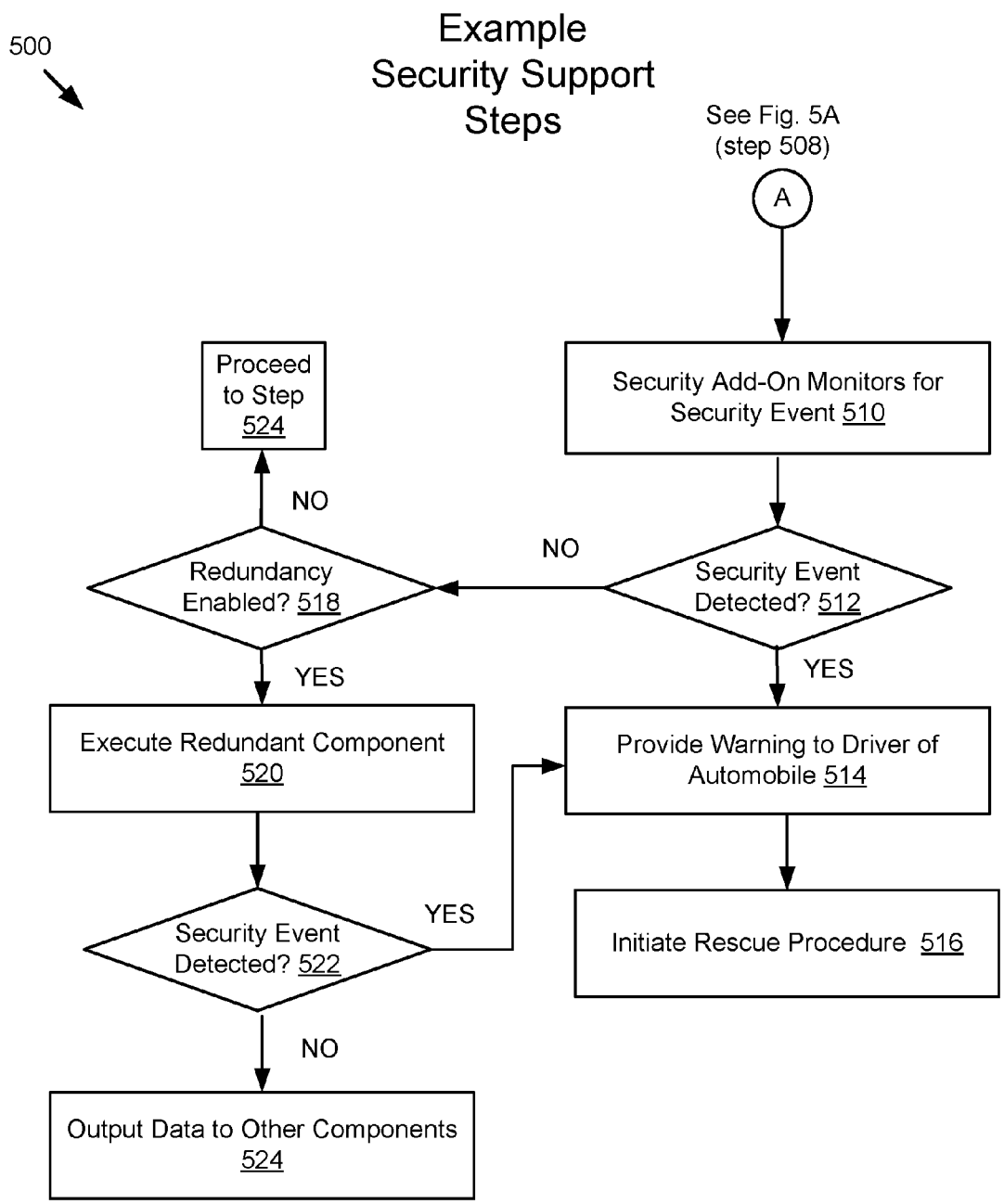

Referring to FIG. 5B, the method 500 may include a security add-on monitoring 510 for a security event. At step 512, the security add-on may determine whether a security event was detected. For example, the security add-on may determine if an attack has occurred. The attack may include, for example, a side channel attack on any element of the automobile modification system.

If a security event is detected at step 512, the method 500 may proceed to step 514. At step 514 the method 500 may include the security add-on providing a warning to the driver of the automobile. The warning may include a visual message such as a GUI, an audio message such as a warning played through the stereo or a combination of a visual message and an audio message. The method 500 may include initiating 516 a rescue procedure. For example, the automobile may be an autonomous vehicle that takes steps to safely stop and disable the automobile.

If a security event is not detected at step 512, the method 500 may proceed to step 518.

At step 518, the method 500 may include determining if redundancy is enabled. For example, the method 500 may include determining whether one or more of a redundant control unit or a redundant adaptive automobile software component is enabled.

If redundancy is not enabled, the method 500 may proceed to step 524.

If redundancy is enabled, the method 500 may proceed to step 520. At step 520, one or more of the redundant components may be executed.

At step 522, the method 500 may include determining whether a security event is detected.

If a security event is not detected at step 522, then the method 500 may move to step 524. At step 524 the method 500 may include outputting data to other components. The outputs may include sensor data or an output.

If a security event is detected at step 522, then the method 500 may proceed to step 514.

Figure 5C:
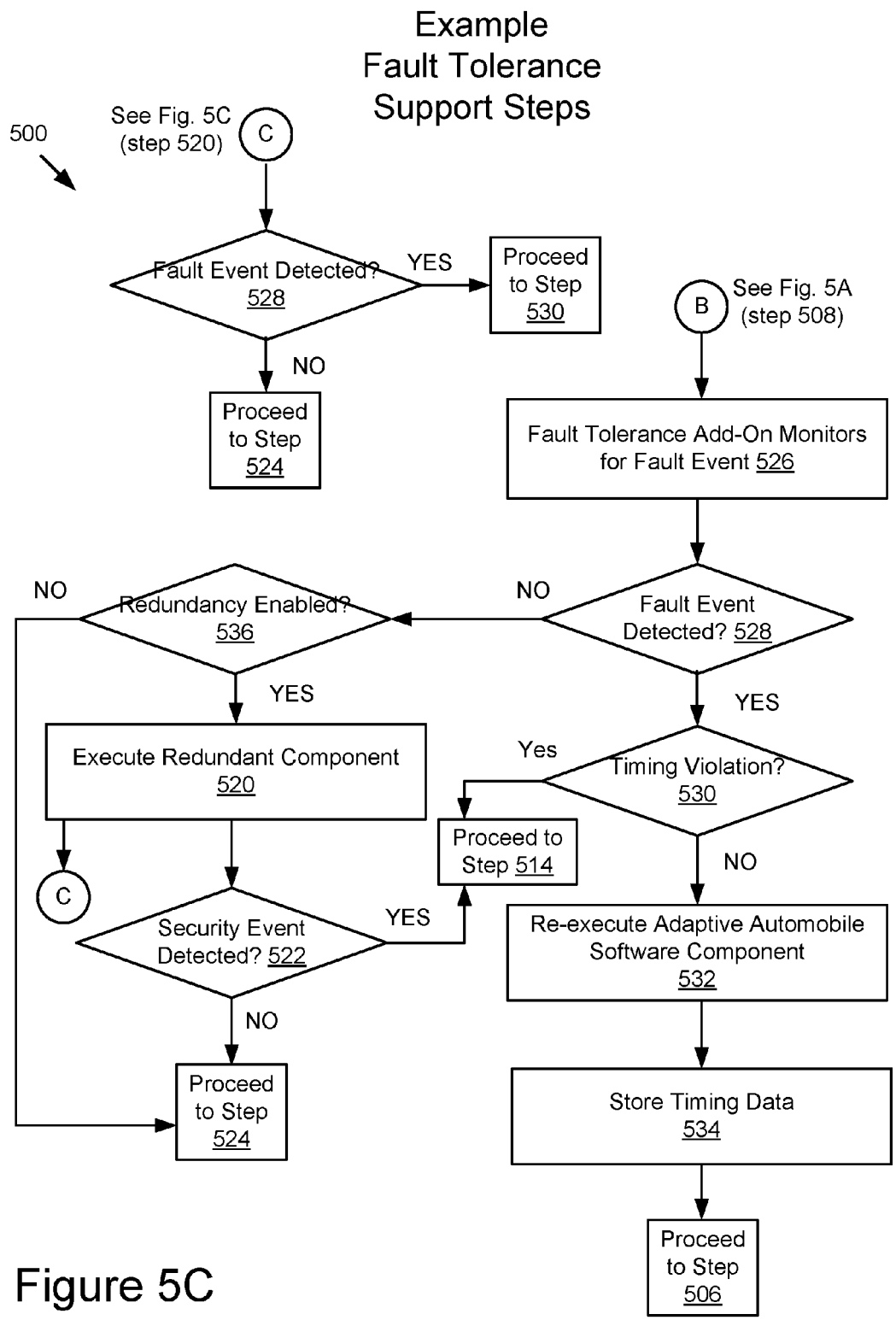

Referring now to FIG. 5C, at step 526 the method may include the fault tolerance add-on monitoring for errors. At step 528 a determination is made regarding whether a fault tolerance event is detected.

If a fault tolerance event is detected at step 528, then the method proceeds to step 530. At step 530 a determination is made regarding whether a timing violation has occurred.

If a timing violation is detected at step 530, the method 500 may proceed to step 514 described above with reference to FIG. 5B.

If no timing violation is detected at step 530, then the method 500 proceeds to step 532. At step 532 the adaptive automobile software component may be re-executed.

At step 534, timing data or state data associated with re-execution of the adaptive automobile software component may be stored at a check point. The method 500 may proceed to step 506, which was described above with reference to FIG. 5A.

If no error is detected at step 528, the method 500 may proceed to step 536.

At step 536, the method 500 may include determining whether a redundancy is enabled. For example, the method 500 may include determining whether one or more of a redundant control unit or a redundant adaptive automobile software component is enabled.

If a determination is made that no redundancy is enabled at step 536, the method 500 may proceed to step 524 described above with reference to FIG. 5B.

If a determination is made that redundancy is enabled at step 536, the method 500 may proceed to step 538.

At step 538, the method 500 may include executing the redundant component.

At step 540, the method 500 may include determining whether a security event (e.g., a security event) is detected.

If no security event is detected at step 540, the method 500 may proceed to step 524 described above with reference to FIG. 5B.

If a security event is detected at step 540, the method 500 may proceed to step 514 described above with reference to FIG. 5B.

Following execution of step 520, a parallel process may be executed in which the method 500 proceeds to step 528 cotemporaneous to proceeding to step 522. Step 522 may begin a security subroutine associated with the operation of the security add-on whereas step 528 may begin a fault tolerance subroutine associated with the fault tolerance add-on.

Referring now to FIG. 6, depicted is a block diagram illustrating an example embodiment of an adaptive automobile middleware component 132. In the below description, the adaptive automobile hardware component 130, the adaptive automobile software component 134 and the plug-in component 160 may be referred to collectively as "components 130, 134, 160." Similarly, the characteristic properties 291 associated with the adaptive automobile hardware component 130, the configurable parameters 293 associated with the adaptive automobile hardware component 130, the characteristic properties 295 associated with the adaptive automobile software component 134 and the configurable parameters 297 associated with the adaptive automobile software component 134 may be referred to collectively as "elements 291, 293, 295, 297."

The adaptive automobile middleware component 132 may read elements 291, 293, 295, 297 from the components 130, 134, 160.

The adaptive automobile middleware component 132 may estimate a level of protection desired based on sensor data or state data describing the environment or the automobile 123 or elements of the automobile 123 such as components 130, 134, 160.

Based on the estimated level of protection needed, the adaptive automobile middleware component 132 may analyze a lookup table (e.g., included in the modification data 140) to select a configuration for the components 130, 134, 160 that will achieve the level of protection desired. This process may be repeated for each or the components 130, 134, 160 so that a configuration may be selected for each of the components 130, 134, 160.

The adaptive automobile middleware component 132 may update the components 130, 134, 160 so that they operate in compliance with the selected configurations.

The lookup table may be created or stored in the memory of the automobile (or the adaptive automobile middleware component 132) at design time. The lookup table may be configured based on a designer's knowledge of the timing and resource constraints associated with the elements of the automobile 123. The lookup table may be updated. For example, nightly updates may be wirelessly pushed to the lookup table via the network 105.

The adaptive automobile middleware component 132 may check for a plug-in component 160 that is newly installed or communicatively coupled to a processor of the automobile 123. For example, the adaptive automobile middleware component 132 may read elements 291, 293, 295, 297 from the components 130, 134, 160 and identify elements 291, 293, 295, 297 associated with the plug-in component 160 that are new. The elements 291, 293, 295, 297 may include modifiable data that is stored in a memory of the components 130, 134, 160 and modifiable during a runtime to cause the automobile 123 to operate in compliance with one or more of a security requirement, a fault tolerance requirement a timing constraint or a resource constraint. For example, the elements 291, 293, 295, 297 may be modifiable data stored in a memory of the components 130, 134, 160 and modifiable at the runtime to cause the automobile 123 to operate in compliance with one or more of a security requirement, a fault tolerance requirement a timing constraint or a resource constraint.

The adaptive automobile middleware component 132 may call a schedulability analysis from the client 170 via the port 184. The schedulability analysis may indicate whether the plug-in component 160 being operated while communicatively coupled to a processor of the automobile 123 violates a timing constraint or a resource constraint.

If no violation of the timing constraint or the resource constraint is identified, then the system including the plug-in component 160 being operated while communicatively coupled to a processor of the automobile 123 is schedulable. The adaptive automobile middleware component 132 may proceed to assign one or more schedulability parameters to the plug-in component 160.

Operating the plug-in component 160 while it is communicatively coupled to the processor of the automobile may affect configurations of other components 130, 134, 160 of the automobile such as an onboard vehicle computer, an ECU, one or more sensors, a bus, etc. Accordingly, the adaptive automobile middleware component 132 may select new configurations for these components 130, 134, 160 and update them accordingly so that they do not violate one or more of a security requirement, a fault tolerance requirement a timing constraint or a resource constraint.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
an onboard vehicle computer of an automobile, the onboard vehicle computer including a processor;
an automobile component that is communicatively coupled to the processor; and
a middleware component of the automobile, the middleware component operable to:
receive sensor data describing an environment of one or more of the automobile component and the automobile; and
adaptively select a configuration from a set of predetermined configurations based on (1) the sensor data and (2) requirement data describing one or more of a new security requirement and a new fault tolerance requirement; and
wherein:
the automobile component includes a non-transitory memory storing modifiable data that is modifiable during a runtime by the middleware component of the automobile to cause the automobile to operate in compliance with one or more of the new security requirement and the new fault tolerance requirement,
the modifiable data is configured so that modification of the modifiable data affects a performance of the automobile component relative to one or more of the new security requirement and the new fault tolerance requirement, and
the modifiable data is modified by the middleware component at the runtime based on the set of predetermined configurations for the modifiable data that was determined at a design time.

2. The system of claim 1, wherein the automobile component is selected from a set that includes: a plug-in component; a sensor; an engine control unit; a vehicle-to-vehicle communication device; a dedicated short range communication device; a software element stored on the non-transitory memory; and a processor-based computing device.

3. The system of claim 1, wherein the middleware component includes an instantiated combination of one or more software components and one or more hardware components that are configured to provide the automobile with fault tolerance support and security support.

4. The system of claim 3, wherein the one or more software components and the one or more hardware components are statically configured and implemented at the design time.

5. The system of claim 1, wherein the sensor data describes one or more measurements detected by one or more sensors of the automobile.

6. A method comprising:
receiving sensor data describing an environment of one or more of an automobile component and an automobile;
adaptively selecting a configuration from a set of predetermined configurations based on (1) the sensor data and (2) requirement data describing one or more of a security requirement and a fault tolerance requirement;
reading in a set of modifiable data from a plurality of elements of the automobile, wherein each of the plurality of the elements includes its own modifiable data stored in its own non-transitory storage medium included in a set of non-transitory storage mediums, wherein the set of modifiable data is modifiable during a runtime to cause the automobile to operate in compliance with one or more of the security requirement and the fault tolerance requirement;

determining that the plurality of elements includes a plug-in component based on a presence of new modifiable data being present in the set of modifiable data;

analyzing the plug-in component to determine whether an operation of the plug-in component would violate a timing constraint or a resource constraint;

determining, for each element included in the plurality of elements of the automobile, an update for the set of modifiable data, wherein the update is configured to cause the plug-in component to operate while communicatively coupled to a processor of the automobile without violating the timing constraint or the resource constraint or causing any of the plurality of elements of the automobile to violate the security requirement or the fault tolerance requirement;

modifying each of the non-transitory storage mediums included in the set of non-transitory storage mediums at the runtime so that they store the update; and operating the plug-in component while the plug-in component is communicatively coupled to an onboard vehicle computer of the automobile.

7. A system comprising:

an automobile including an onboard vehicle computer of the automobile, the onboard vehicle computer including a processor, an adaptive automobile hardware component and an adaptive automobile middleware component that is communicatively coupled to the processor and the adaptive automobile hardware component;

wherein the adaptive automobile middleware component, which is communicatively coupled to the processor and the adaptive automobile component, is operable to:
identify at a runtime, based on automobile requirement data that describes a new requirement for the automobile, a presence of the new requirement for the automobile;
determine whether an operation of the adaptive automobile hardware component yields first sensor data that complies with the new requirement; and
select a first selected configuration that is configured to cause the adaptive automobile hardware component to operate in compliance with the new requirement during the runtime as indicated by yielding new sensor data that complies with the new requirement;

wherein the adaptive automobile hardware component, which is communicatively coupled to the processor and the adaptive automobile middleware component, is a processor-based device of the automobile that includes a first security add-on, a first fault tolerance add-on and a first data structure storing a first characteristic property and a first configurable parameter;

wherein the first characteristic property includes a first timing setting that affects a first timing of a first process associated with functionality provided responsive to the operation of the adaptive automobile hardware component;

wherein the first configurable parameter includes one or more of the following:
a first security setting that affects functionality provided by the first security add-on responsive to the operation of the adaptive automobile hardware component; and
a first fault tolerance setting that affects functionality provided by the first fault tolerance add-on responsive to the operation of the adaptive automobile hardware component; and wherein the first data structure is configured so that execution of the adaptive automobile middleware component by the processor enables the processor to access and modify:
the first characteristic property which modifies, during the runtime, the first timing of the first process; and
the first configurable parameter which modifies, during the runtime, one or more of the first security setting and the first fault tolerance setting.

8. The system of claim 7, wherein the adaptive automobile hardware component is an automobile sensor.

9. The system of claim 7, wherein the adaptive automobile hardware component is an engine control unit.

10. The system of claim 7, wherein:
the first selected configuration is selected from first modification data describing a first set of predetermined configurations for the first characteristic property and the first configurable parameter that were determined at a design time; and
wherein the adaptive automobile middleware component is further operable to modify the first data structure so that it stores data for the first characteristic property and the first configurable parameter that is consistent with the first selected configuration and modifies at least one of the first characteristic property and the first configurable parameter.

11. The system of claim 10, wherein the adaptive automobile middleware component includes further instructions that, responsive being executed by the processor, causes the processor to operate the adaptive automobile hardware component to ensure its operation yields the new sensor data that complies with the new requirement.

12. The system of claim 10, wherein the first set of predetermined configurations includes one or more predetermined configurations that modify one or more of the first timing of the operation of the adaptive automobile hardware component, the operation of the first security add-on and the operation of the first fault tolerance add-on.

13. The system of claim 10, wherein the first set of predetermined configurations are determined at the design time and the first data structure is modified at the runtime, and wherein the design time includes a nightly update received wirelessly from a network and including the first modification data.

14. The system of claim 10, wherein the first characteristic property modifies the first timing of the first process cotemporaneous to identifying the new requirement.

15. The system of claim 10, wherein the first configurable parameter modifies one or more of the first security setting and the first fault tolerance setting cotemporaneous to identifying the new requirement.

16. The system of claim 10, wherein the first security add-on includes instructions that, responsive to being executed by the processor, causes the processor to monitor for a security event based on one or more requirements indicated by the first selected configuration stored in the first data structure.

17. The system of claim 10, wherein the first fault tolerance add-on includes instructions that, responsive to being executed by the processor, causes the processor to monitor for a fault event based on the new requirement indicated by the first selected configuration stored in the first data structure.

18. The system of claim 10:
   wherein the automobile further comprises an adaptive automobile software component that is communicatively coupled to the processor and the adaptive automobile middleware component; and
   wherein the adaptive automobile software component includes a second security add-on, a second fault tolerance add-on and a second data structure storing a second characteristic property and a second configurable parameter;
      wherein the second characteristic property includes a second timing setting that affects a second timing of a second process associated with functionality provided responsive to execution of the adaptive automobile software component;
      wherein the second configurable parameter includes one or more of the following:
         a second security setting that affects functionality provided by the second security add-on responsive to the execution of the adaptive automobile software component; and
         a second fault tolerance setting that affects functionality provided by the second fault tolerance add-on responsive to operation of the adaptive automobile software component; and
      wherein the second data structure is configured so that execution of the adaptive automobile middleware component by the processor enables the processor to access and modify:
         the second characteristic property which modifies, during the runtime, the second timing of the second process; and
         the second configurable parameter which modifies, during the runtime, one or more of the second security setting and the second fault tolerance setting.

19. The system of claim 18, wherein the adaptive automobile middleware component includes further instructions that, responsive to being executed by the processor, causes the processor to: determine, based on second sensor data which describes the execution of the adaptive automobile software component, whether the execution of the adaptive automobile software component yields second sensor data that complies with the new requirement; select, from second modification data describing a second set of predetermined configurations for the second characteristic property and the second configurable parameter that were determined the design time, a second selected configuration that is configured to cause the adaptive automobile software component to execute in compliance with the new requirement during the runtime as indicated by yielding additional sensor data that complies with the new requirement for the adaptive automobile software component; modify the second data structure so that it stores data for the second characteristic property and the second configurable parameter that is consistent with the second selected configuration and modifies at least one of the second characteristic property and the second configurable parameter; and operate the adaptive automobile hardware component to ensure its operation yields the additional sensor data that complies with the new requirement.

20. The system of claim 19, wherein the second characteristic property modifies the second timing of the second process cotemporaneous to identifying the new requirement.

21. The system of claim 19, wherein the second configurable parameter modifies one or more of the second security setting and the second fault tolerance setting cotemporaneous to identifying the new requirement.

22. The system of claim 19, wherein the second security add-on includes instructions that, responsive to being executed by the processor, causes the processor to monitor for a security event based on one or more requirements indicated by the second selected configuration stored in the second data structure.

23. The system of claim 19, wherein selection of the second selected configuration is configured to not provide a highest level of security or a highest level of fault tolerance, so that a computational overhead for the processor is reduced and a performance level for the processor is increased or maintained.

24. The system of claim 19, wherein the system further comprises a redundant adaptive automobile software component that is modified based on the second selected configuration and the adaptive automobile middleware component includes further instructions that, responsive to being executed by the processor, causes the processor to:
   execute the redundant adaptive automobile software component to yield redundant sensor data that describes the execution of the redundant adaptive automobile software component;
   analyze the redundant sensor data to determine whether substantially matches the additional sensor data; and
   initiate a recovery process responsive to determining that the redundant sensor data does not substantially match the additional sensor data.

25. A method comprising:
   receiving, by an adaptive automobile middleware component being executed by a processor of an automobile, sensor data describing an environment of one or more of an automobile component and an automobile, wherein the processor is part of an onboard vehicle computer of the automobile;
   determining, by the adaptive automobile middleware component being executed by the processor of the automobile, a presence of a new plug-in component being communicatively coupled to the processor, wherein the new plug-in component includes a first security add-on, a first fault tolerance add-on and a first data structure;
   determining, based on automobile requirement data that describes a safety requirement and a fault tolerance requirement for elements of the automobile, a first characteristic property that includes a first timing setting that affects a first timing of a first process associated with functionality provided responsive to an operation of the new plug-in component;
   determining, based on the sensor data and the automobile requirement data, a first configurable parameter that includes one or more of the following:
      a first security setting that affects functionality provided by the first security add-on responsive to the operation of the new plug-in component; and
      a first fault tolerance setting that affects functionality provided by the first fault tolerance add-on responsive to the operation of the new plug-in component; and
   modifying a first data structure included in the new plug-in component so that the new plug-in component operates based on the first characteristic property and the first configurable parameter;

determining, based on the sensor data, the automobile requirement data and an estimation of how the first characteristic property and the first configurable parameter affect the operation of the automobile relative to the safety requirement and the fault tolerance requirement for the elements of the automobile, modifications for (1) a set of second characteristic parameters that affect timing of operations for one or more other elements of the automobile that do not include the new plug-in component and (2) a set of second configurable parameters that affect one or more second security settings and one or more second fault tolerance settings for the one or more other elements of the automobile, wherein the modifications are configured to cause the other elements to operate in compliance with the safety requirement and the fault tolerance requirement while the new plug-in component is one of the elements of the automobile;

updating a set of second data structures associated with the one or more other elements of the automobile so that the set of second data structures stores data that is consistent with the modifications for the set of second characteristic parameters and the set of second configurable parameters; and operating the new plug-in component.

* * * * *